(12) United States Patent
Chin et al.

(10) Patent No.: US 8,146,937 B2
(45) Date of Patent: *Apr. 3, 2012

(54) TWIN-FRAME BICYCLE

(76) Inventors: Hsu-Sheng Chin, Kaohsiung (TW);
Tsung-Lin Fan Chiang, Kaohsiung (TW); Chih-Ching Chin, Kaohsiung (TW)

( * ) Notice: Subject to any disclaimer, the term of this patent is extended or adjusted under 35 U.S.C. 154(b) by 67 days.

This patent is subject to a terminal disclaimer.

(21) Appl. No.: 12/814,203

(22) Filed: Jun. 11, 2010

(65) Prior Publication Data

US 2011/0304119 A1     Dec. 15, 2011

(51) Int. Cl.
*B62K 13/06* (2006.01)
(52) U.S. Cl. .................... 280/209; 280/7.16
(58) Field of Classification Search .............. 280/209, 280/7.16, 204, 222, 231, 273
See application file for complete search history.

(56) References Cited

U.S. PATENT DOCUMENTS

| 3,175,843 | A | * | 3/1965 | Burke | 280/209 |
| 3,350,115 | A | * | 10/1967 | Ferrary | 280/209 |
| 3,865,401 | A | * | 2/1975 | Kingsly | 280/209 |
| 3,902,738 | A | * | 9/1975 | Gandrud | 280/209 |
| 4,290,620 | A | * | 9/1981 | Chika | 280/209 |
| 5,511,809 | A | * | 4/1996 | Sagi | 280/209 |
| 6,022,036 | A | * | 2/2000 | Chartrand | 280/209 |
| 6,068,278 | A | * | 5/2000 | Kock et al. | 280/209 |
| 6,170,844 | B1 | * | 1/2001 | Sasi | 280/209 |
| 6,554,308 | B2 | * | 4/2003 | Black | 280/231 |
| 6,666,468 | B2 | * | 12/2003 | McCandless | 280/209 |

* cited by examiner

*Primary Examiner* — Tony Winner
(74) *Attorney, Agent, or Firm* — WPAT, P.C.; Anthony King

(57) ABSTRACT

The present invention relates to a twin-frame bicycle, particularly to one that can be pedaled by two riders in side-by-side coordination so that the riders and the twin-frame bicycle will incline integrally without tumbling or overturning. At least one articulation mechanism is disposed between a primary bicycle body and an auxiliary bicycle body, wherein the articulation mechanism serves in synergy an articulation parallelogram, and a resilient tension mechanism having an elastic element is disposed between the primary bicycle body and the auxiliary bicycle body and counteracts the deformation of the articulation mechanism to maintain equilibrium.

24 Claims, 25 Drawing Sheets

TWIN-FRAME BICYCLE

BACKGROUND OF THE INVENTION

1. Field of the Invention

The present invention relates to a bicycle, particularly to a twin-frame bicycle.

2. Description of the Related Art

Bicycle is a very popular human-powered transportation means. A bicycle is unstable when standing still and must rely on the rider to maintain equilibrium. Upon driving turns, inertia makes the bicycle body keep forwarding along the original direction. If the center of gravity is too high, bicycle speed is too fast or the bicycle turns urgently, even friction force is enough to offer the necessary centripetal force, the centrifugal moment may cause the bicycle body to rotate and overturn.

When a bicycle turns, by inclination of the driver's body and the bicycle body, the reversed moment can be created to reduce the centrifugal moment which may cause the bicycle to overturn outwards. Because of this, bicycle is naturally more stable in motion than tricycle or four-wheeled vehicle. Currently, one kind of dual-riding bicycle of tandem type already exists in the market. The two driver saddles of a tandem bicycle are arranged one after the other instead of side by side. Just like the conventional bicycle, the tandem bicycle must rely on the rider to maintain equilibrium when standing still. Another kind of dual-riding bicycle, of parallel type, also exists. However, the structure of a parallel dual-riding bicycle links two independent bicycles by a fixing rod, which results in awkward action at high speed or when turning. At high speed, sharp turn or bumpy road may cause the parallel dual-riding bicycle to overturn. Thus, it is only good for children learning to walk.

Consequently, there is a need for a twin-frame bicycle to solve the above-mentioned problems.

SUMMARY OF THE INVENTION

The present invention is directed to a twin-frame bicycle, which includes a primary bicycle body, an auxiliary bicycle body, at least one articulation mechanism and a resilient tension mechanism. The primary bicycle body has a primary bicycle frame, a front wheel, a rear wheel and a pedal mechanism. The front wheel and the rear wheel are connected pivotally to the primary bicycle frame and distanced from each other. The pedal mechanism is used to drive the front wheel or the rear wheel. The auxiliary bicycle body has an auxiliary bicycle frame and a first auxiliary wheel. The auxiliary wheel is connected pivotally to the auxiliary bicycle frame. The articulation mechanism has a first end, a second end and at least two linking portions. The first end and the second end are connected to the primary bicycle frame and the auxiliary bicycle frame, respectively. The linking portions are substantially disposed in parallel between the first end and the second end. The first end, the second end and the linking portions form a movable quadrangle. The resilient tension mechanism has an elastic element disposed between the primary bicycle body and the auxiliary bicycle body.

The twin-frame bicycle can be pedaled by two riders riding side by side or pedaled individually. Besides providing fun riding, the articulation mechanism linking the primary bicycle body and the auxiliary bicycle body makes the twin-frame bicycle stable and unlikely to tumble or overturn. In addition, since the structure of the auxiliary bicycle body is simple, the cost is saved and the maintenance of the twin-frame bicycle is easy. The structure of the articulation mechanism can be further simplified, thus saving more production cost. Furthermore, by utilizing the articulation mechanism together with the resilient tension mechanism having an elastic element, the twin-frame bicycle can always stand straight up and be controlled much smoothly.

DETAILED DESCRIPTION OF THE INVENTION

Figure 1A:
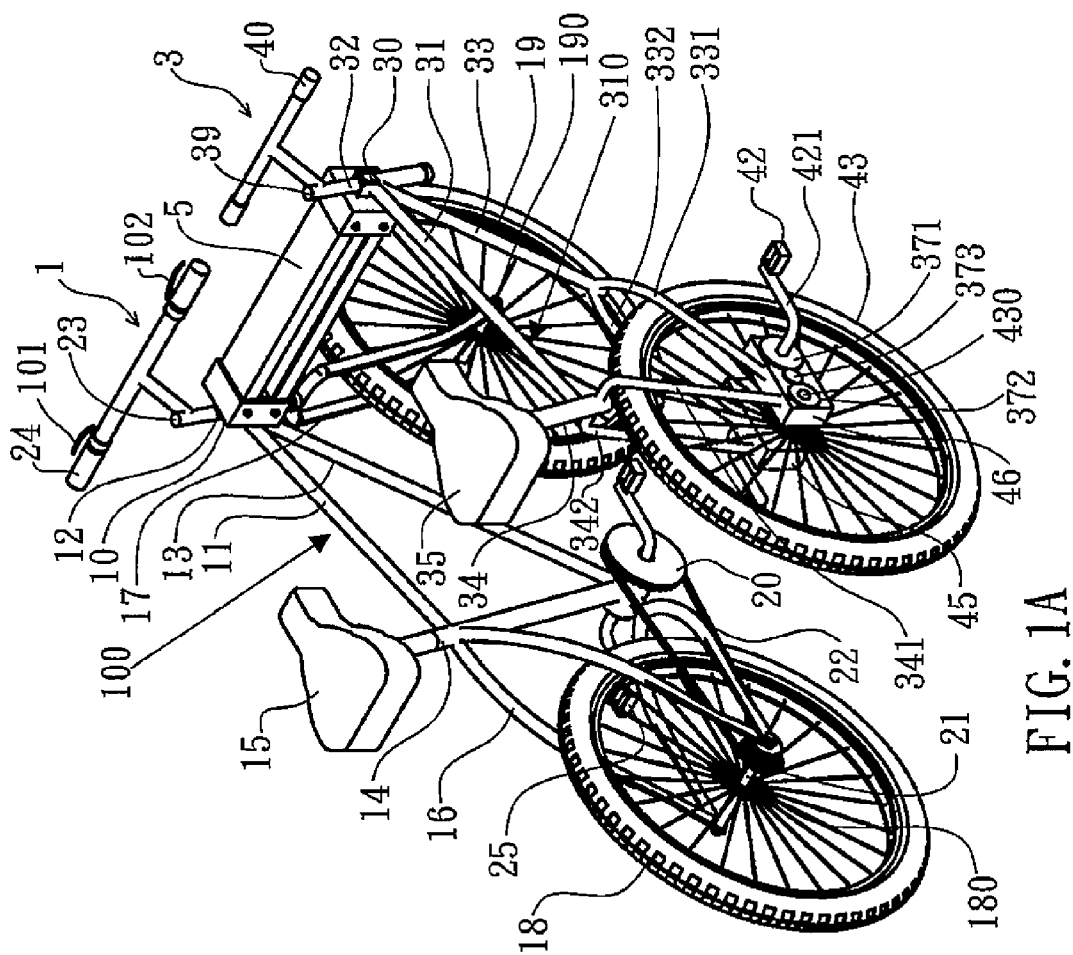
FIG. 1A is a perspective schematic view of a twin-frame bicycle of the present invention.

As shown in FIGS. 1A-3 and 7, a twin-frame bicycle includes a primary bicycle body 1, an auxiliary bicycle body 3, an articulation mechanism 5 and a resilient tension mechanism 4. A saddle 15 of the primary bicycle body 1 and a saddle 35 of the auxiliary bicycle body 3 are arranged in side-by-side juxtaposition instead of one behind the other.

In this embodiment, the primary bicycle body 1 has a primary bicycle frame 100, a front wheel 19, a rear wheel 18 and a pedal mechanism. The front wheel 19 and the rear wheel 18 are connected pivotally to the primary bicycle frame 100 and distanced from each other. The pedal mechanism is used to drive the front wheel 19 or the rear wheel 18. The auxiliary bicycle body 3 has an auxiliary bicycle frame 310 and a first auxiliary wheel 43. The first auxiliary wheel 43 is connected pivotally to the auxiliary bicycle frame 310. The articulation mechanism 5 has a first end 50, a second end 59 and at least two linking portions 53, 54. The first end 50 and the second end 59 are connected to the primary bicycle frame 100 and the auxiliary bicycle frame 310, respectively. In this embodiment, the linking portions 53, 54 are substantially disposed in parallel between the first end 50 and the second end 59. The first end 50, the second end 59 and the linking portions 53, 54 form a movable quadrangle. The movable quadrangle can move vertically corresponding to the ground plane.

The primary bicycle body 1 can be a conventional bicycle having a basic structure. In this embodiment, the primary bicycle frame 100 of the primary bicycle body 1 comprises a cross top bar 11, a head sleeve tube 12, a bottom bar 13 and an upright seat bar 14. The saddle 15 is disposed on the top of the upright seat bar 14. An axle 23 connected with a front fork 17 and a steering handle 24 is inserted pivotally in the head sleeve tube 12, and the steering handle 24 and the front fork 17 are disposed pivotally at corresponding ends of the head sleeve tube 12. The front wheel 19 is connected pivotally to the front fork 17. The upright seat bar 14 connects a rear fork 16, and the rear wheel 18 is connected pivotally to the rear fork 16. Disposed pivotally in a common joint of the bottom bar 13 and the upright seat bar 14 are a front sprocket wheel 20 and a pedal mechanism which is used to drive the front sprocket wheel 20. In this embodiment, the pedal mechanism comprises a pair of cranks and pedals 25, 26, the cranks are connected to both sides of the center of the front sprocket wheel 20, and the pedals 25, 26 are connected to the cranks. A rear sprocket wheel 21 is disposed pivotally in hub of the rear wheel 18, and the front sprocket wheel 20 and the rear sprocket wheel 21 are linked by a chain 22 in engagement manner.

The first auxiliary wheel 43 is connected pivotally to the auxiliary bicycle frame 310, and the auxiliary bicycle body 3 may not have a front fork, a rear fork, a front wheel and a rear wheel but it still has a cross top bar 31, a head sleeve tube 32, a bottom bar 33, an upright seat bar 34, a saddle 35, an active gear 371, a passive gear 372, a middle gear 373, a stem 39, a steering handle 40 and a pedal mechanism. In this embodiment, the pedal mechanism comprises a pair of cranks 411, 421 and a pair of pedals 41, 42, the cranks 411, 421 are connected to both sides of the shaft of the first auxiliary wheel 43, and the pedals 41, 42 are connected to the cranks 411, 421, respectively. The steering handle 40 is connected pivotally to the head sleeve tube 32, the saddle 35 is disposed on the top of the upright seat bar 34, and the pedal mechanism of the auxiliary bicycle body drives the first auxiliary wheel 43.

Figure 1B:
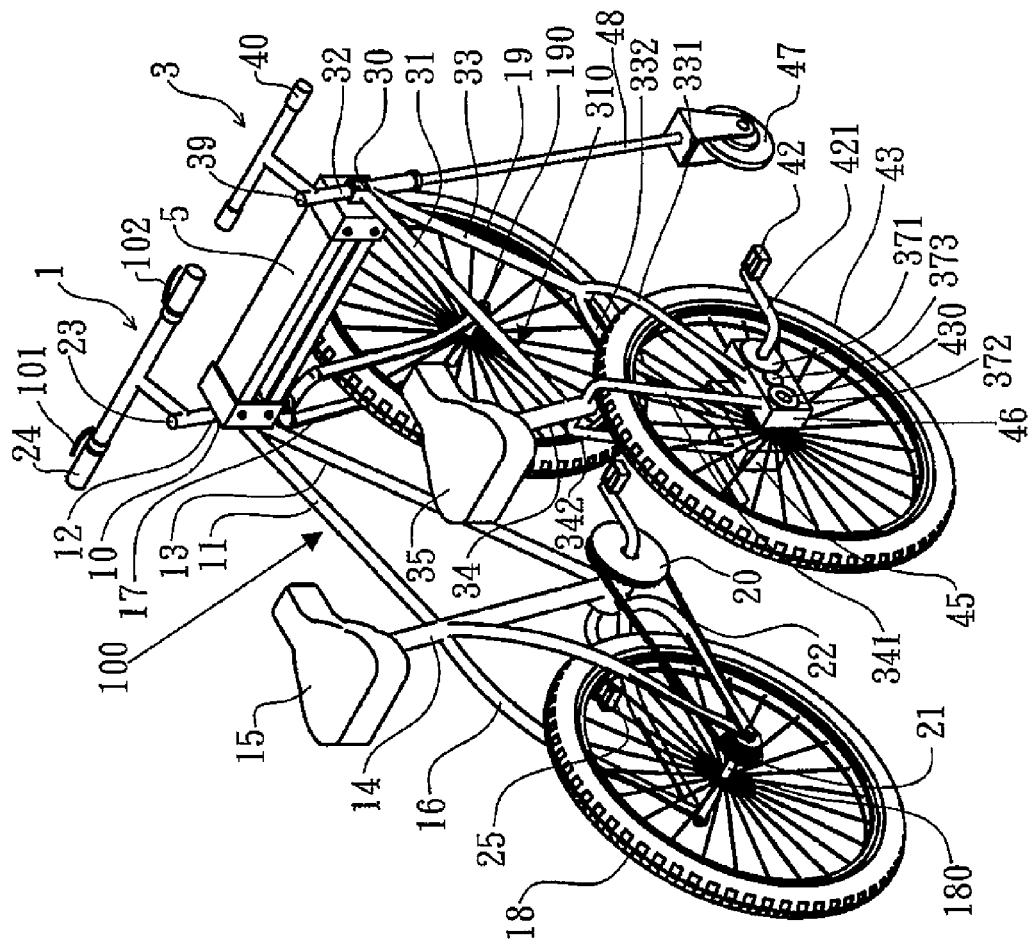
FIG. 1B is a perspective schematic view of another embodiment of a twin-frame bicycle of the present invention, wherein the auxiliary bicycle frame of the twin-frame bicycle has an additional wheel.
Figure 2A:
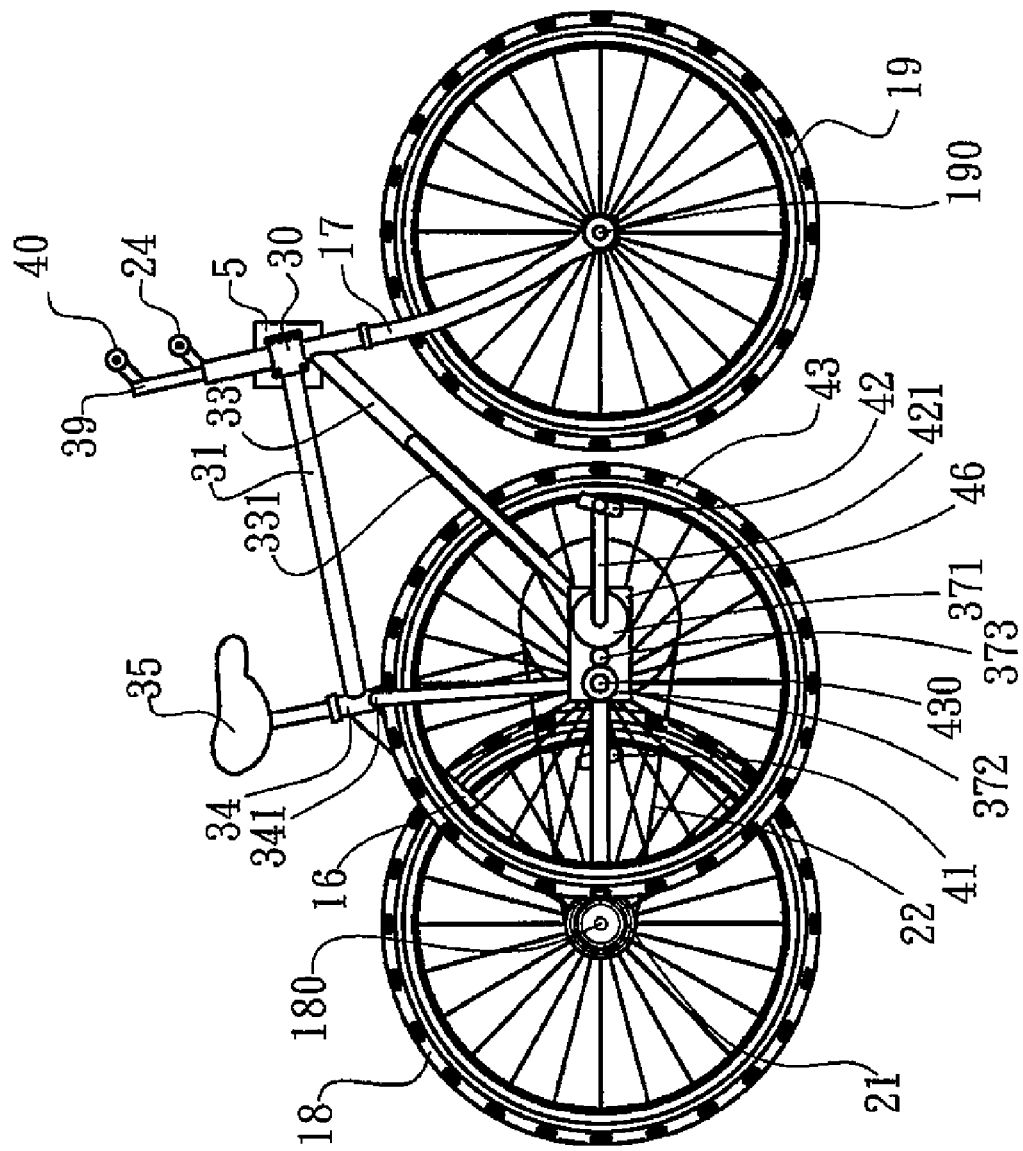
FIG. 2A is the right lateral view of FIG. 1A.
Figure 2B:
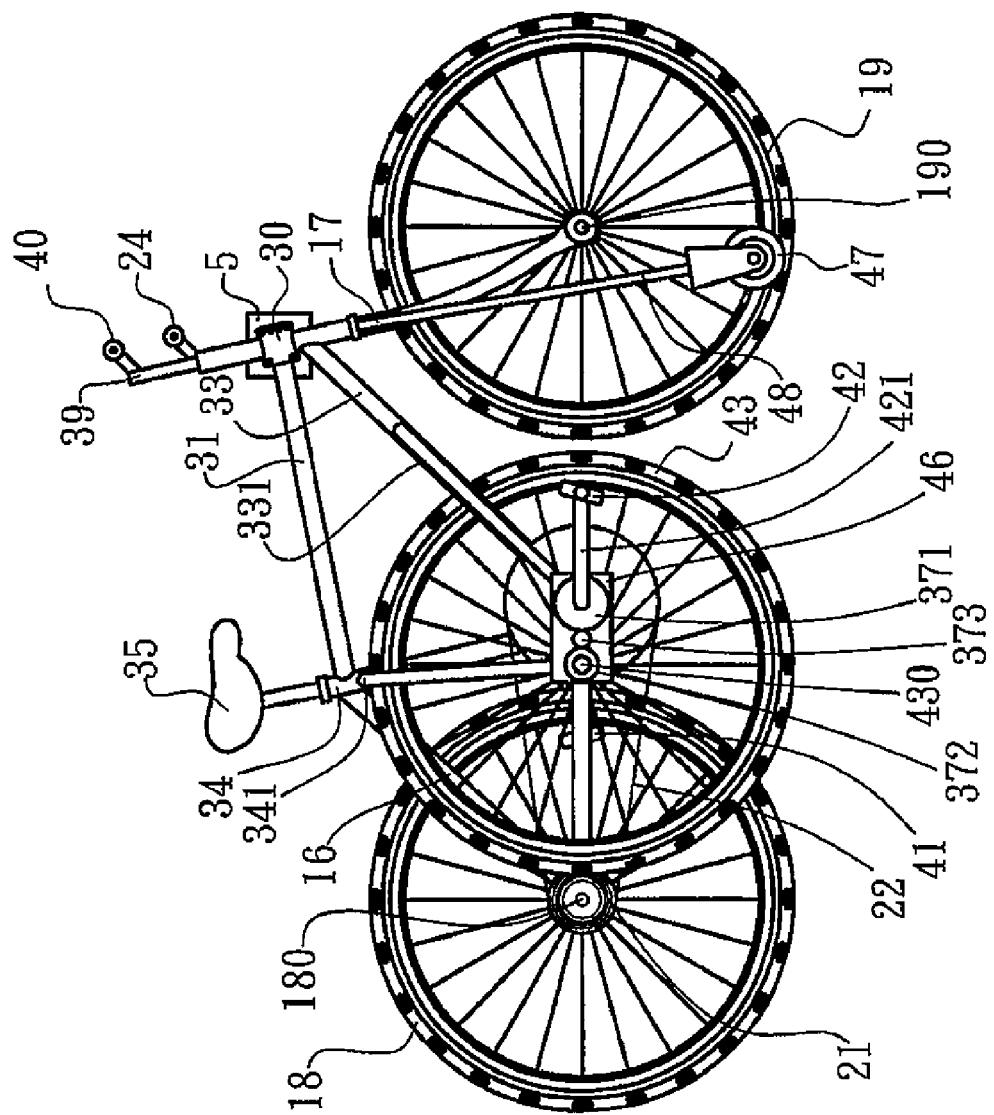
FIG. 2B is the right lateral view of FIG. 1B.

In other embodiments, the auxiliary bicycle body 3 can further comprise an additional wheel 47 and an adjustable bar 48 (as shown in FIGS. 1B and 2B). One end of the adjustable bar 48 is connected to the auxiliary bicycle frame 310, and the additional wheel 47 is disposed at the other end of the adjustable bar 48. In this embodiment, the adjustable bar 48 is disposed at the head sleeve tube 32 and the additional wheel 47 is smaller than the first auxiliary wheel 43. The front wheel 19, the rear wheel 18 and the first auxiliary wheel 43 contact the ground plane, and the additional wheel 47 may optionally contact the ground plane. Preferably, the additional wheel 47 does not contact the ground plane; however, the additional wheel 47 may contact the ground plane when making a turn or a brake. As a result, the twin-frame bicycle of the invention is highly stable without any possibility of tumbling, even in a high-speed riding and/or a sudden braking.

The bottom bar 33 and the upright seat bar 34 are not very long and from two ends extend to connect two side bars 331, 332 and two upright side bars 341, 342, respectively. The side bars 331, 332 and the upright side bars 341, 342 are connected two fixing bases 45, 46. The first auxiliary wheel 43 having a rung is disposed pivotally between the fixing bases 45, 46. A shaft 430 is disposed pivotally at the center of the first auxiliary wheel 43, and the fixing bases 45, 46 are disposed at the corresponding ends of the shaft 430. In this embodiment, two ends of the shaft 430 are connected to the fixing bases 45, 46. The middle gear 373 is disposed between the active gear 371 and the passive gear 372. The cranks 411, 421 connected with the pedals 41, 42 are connected to the corresponding cranks 411, 421. The passive gear 372 is disposed pivotally at the shaft 430 and moves along with the rung. Through the cranks 411, 421, the pedals 41, 42 drive the active gear 371, so as to drive the middle gear 373 and the passive gear 372. It should be noted that in other embodiments, the auxiliary bicycle body 3 can optionally comprise a plurality of middle gear 373 between the active gear 371 and the passive gear 372 according to various designs.

Figure 6:
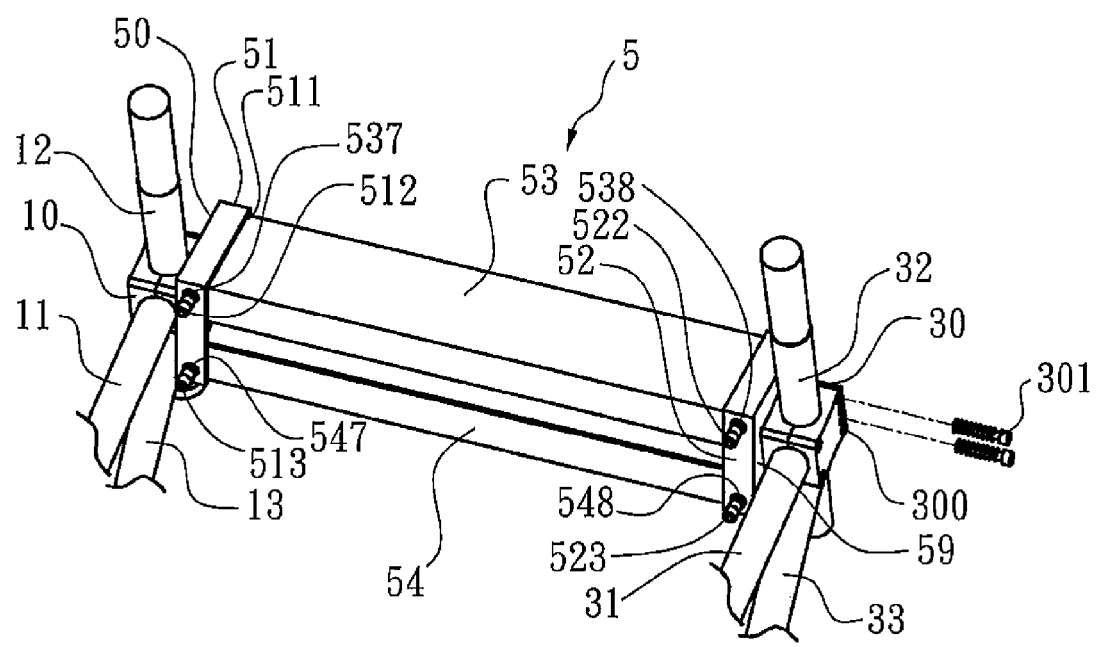
FIG. 6 is a schematic view of an articulation mechanism of the present invention.

The resilient tension mechanism 4 has an elastic element 55 disposed between the primary bicycle body 1 and the auxiliary bicycle body 3. As shown in FIGS. 1A and 6, in this embodiment, two ends of the resilient tension mechanism 4 are connected to the first end 50 and the second end 59, respectively, and the elastic element 55 is substantially parallel to the linking portions 53, 54. It should be noted that in other embodiments, two ends of the resilient tension mechanism 4 can be connected directly to the primary bicycle body 1 and the auxiliary bicycle body 3, respectively, and the elastic element 55 is substantially orthogonal to the linking portions 53, 54.

In this embodiment, the first end 50 of the articulation mechanism 5 is the extremity of a left holding base 51, and the left holding base 51 is screw-fixed to a connecting bulk 10 around the head sleeve tube 12; the second end 59 is the extremity of a right holding base 52, wherein a bolt 301 passes through fixing holes 300 of a connecting bulk 30 around the head sleeve tube 32 and into round holes 520 to fixes the right holding base 52. The holding bases 51 have a holding cavity 511 and a holding cavity 521, and the linking portions 53, 54 are disposed pivotally in corresponding holding cavities 511, 521.

Figure 7:
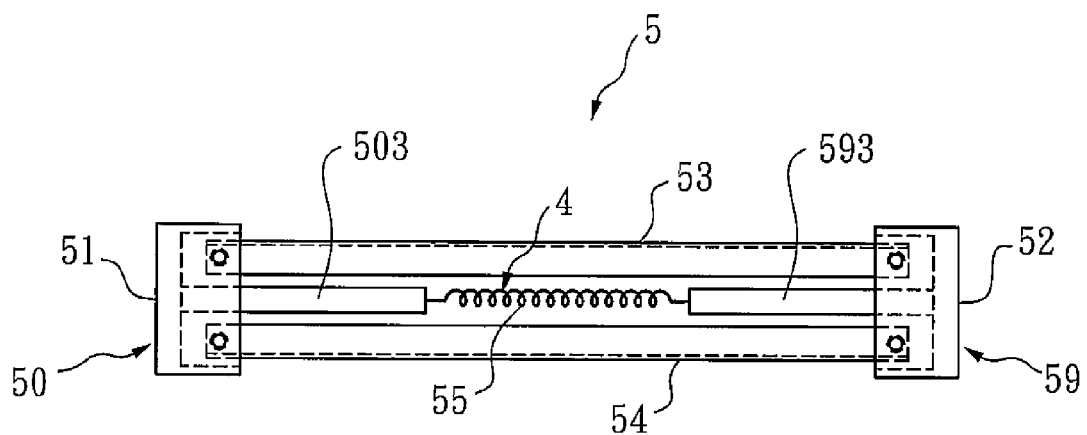
FIG. 7 is a front view of the articulation mechanism of the present invention.
Figure 8:
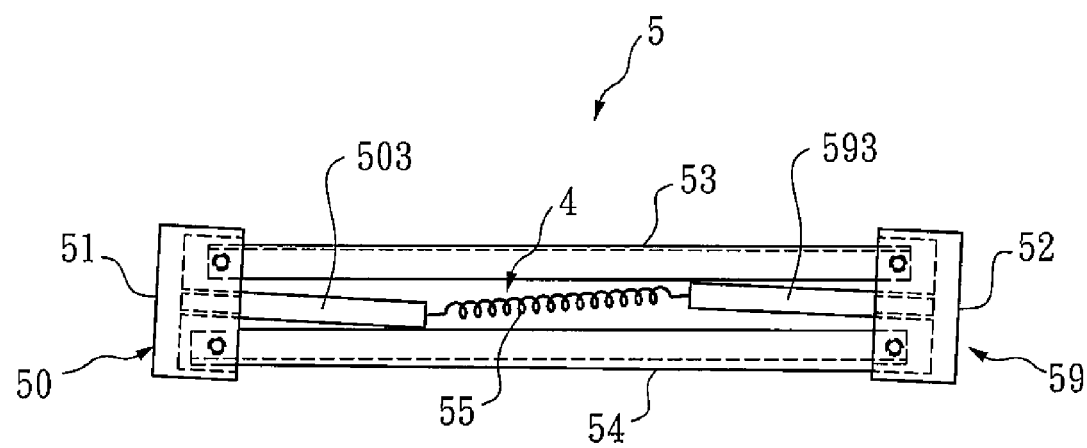
FIG. 8 is an operational view showing the articulation mechanism of FIG. 7.

As shown in FIGS. 7 and 8, in this embodiment, the first end 50 further comprises a first foundation 503, the second end 59 further comprises a second foundation 593, and the two ends of the elastic element 55 are connected to the first foundation 503 and the second foundation 593, respectively. The first foundation 503 and the second foundation 593 are protrusions, and the two ends of the elastic elements 55 are connected to corresponding ends of the protrusions, respectively. When the elastic element 55 deforms, the elastic potential energy caused by the deformed elastic element 55 can provide a require resilient for reinstating the articulation mechanism 5, so as to balance the primary bicycle body 1 and the auxiliary bicycle body 3.

Figure 9:
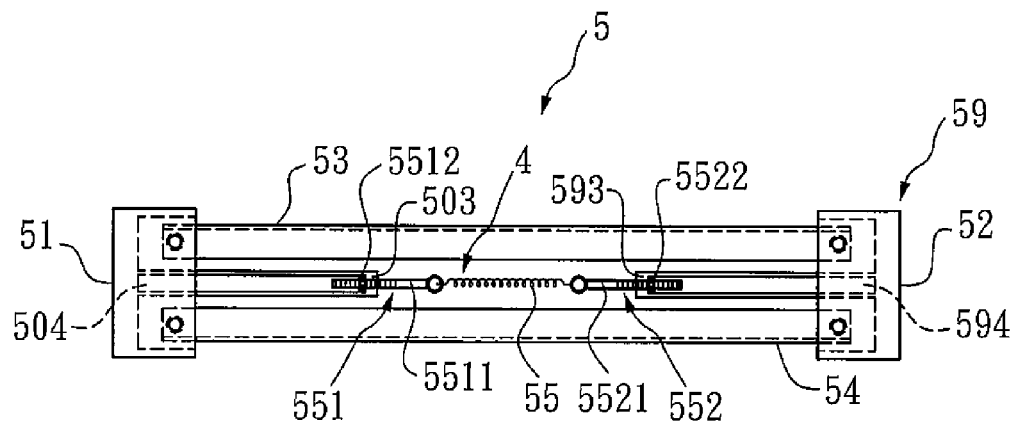
FIG. 9 is a schematic view of another embodiment of an articulation mechanism of the present invention.
Figure 10:
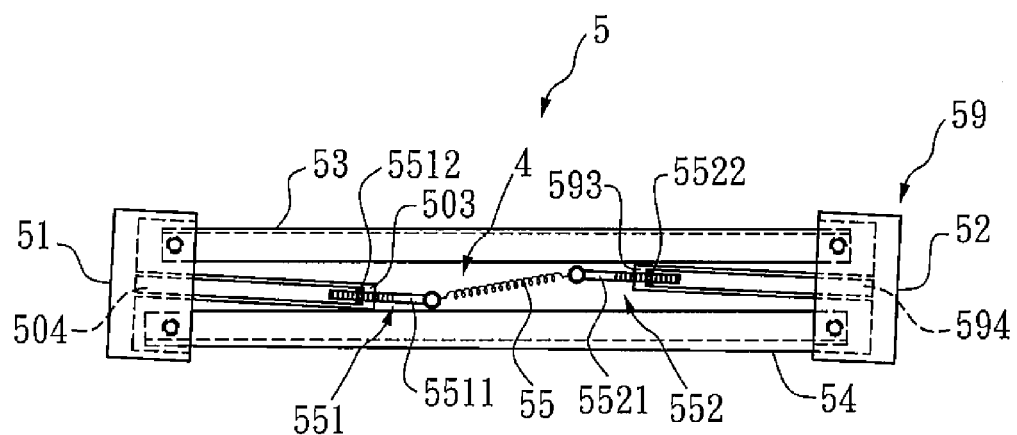
FIG. 10 is an operational view showing the articulation mechanism of FIG. 9.

As shown in FIGS. 9 and 10, in another embodiment, the resilient tension mechanism 4 comprises a first adjustable unit 551 and a second adjustable unit 552 disposed at two ends of the elastic element 55. The first adjustable unit 551 comprises a first stepping portion 5511 and a first adjusting portion 5512, the second adjustable unit 552 comprises a second stepping portion 5521 and a second adjusting portion 5522. The first foundation 503 comprises a first recess 504, and the second foundation 593 comprises a second recess 594. The first stepping portion 5511 and the second stepping portion 5521 penetrate the first foundation 503 and the second foundation 593, respectively. The first adjusting portion 5512 and the second adjusting portion 5522 are disposed in the first recess 504 and the second recess 594 and connected to the first stepping portion 5511 and the second stepping portion 5521, respectively. Two ends of the resilient tension mechanism 4 are connected to the primary bicycle body 1 and the auxiliary bicycle body 3, respectively, and the elastic element 55 is substantially parallel to the linking portions 53, 54. Through adjusting the first stepping portion 5511 and the second stepping portion 5521 by the first adjusting portion 5512 and/or the second adjusting portion 5522, the length of the elastic element 55 is changed, and the deformed elastic element 55 can provide a require resilient force for reinstating the articulation mechanism 5, so as to balance the primary bicycle body 1 and the auxiliary bicycle body 3.

Figure 11:
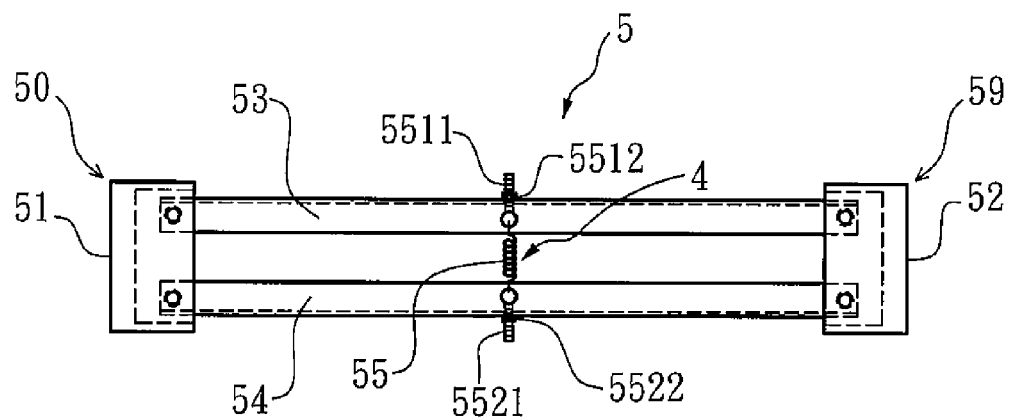
FIG. 11 is a schematic view of another embodiment of an articulation mechanism of the present invention.
Figure 12:
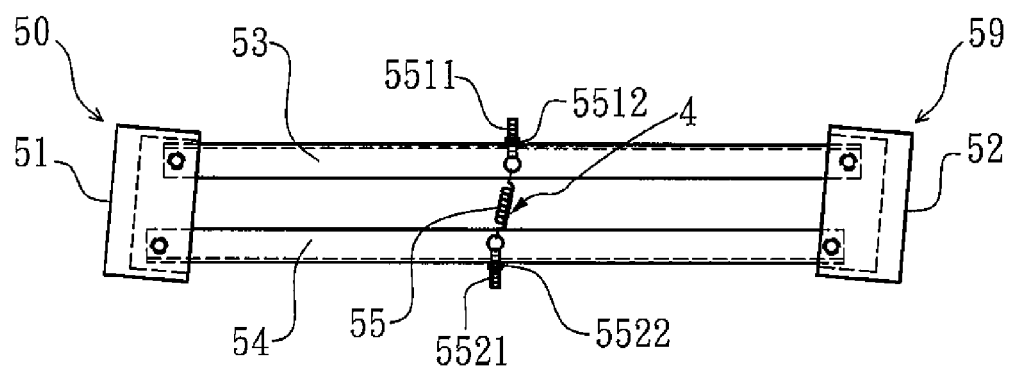
FIG. 12 is an operational view showing the articulation mechanism of FIG. 11.

It should be noted that, as shown in FIGS. 11 and 12, in other embodiment, two ends of the resilient tension mechanism 4 can be connected to the at least two linking portions 53, 54, respectively. In this embodiment, the elastic element 55 is substantially orthogonal to the linking portions 53, 54. That is, the first stepping portion 5511 and the second stepping portion 5521 penetrate the linking portions 53, 54, respectively; the first adjusting portion 5512 and the second adjusting portion 5522 are connected to the first stepping portion 5511 and the second stepping portion 5522, respectively; and the linking portions 53, 54 are between the first adjusting portion 5512 and the second adjusting portion 5522. The first adjusting portion 5512 and/or the second adjusting portion 5522 can adjust the first adjusting portion 5512 and the second adjusting portion 5522 to change the length of the elastic element 55. Similarly, through adjusting the first stepping portion 5511 and the second stepping portion 5521 by the first adjusting portion 5512 and/or the second adjusting portion 5522, the length of the elastic element 55 is changed, and the deformed elastic element 55 can provide a require resilient force for reinstating the articulation mechanism 5, so as to balance the primary bicycle body 1 and the auxiliary bicycle body 3.

Figure 13:
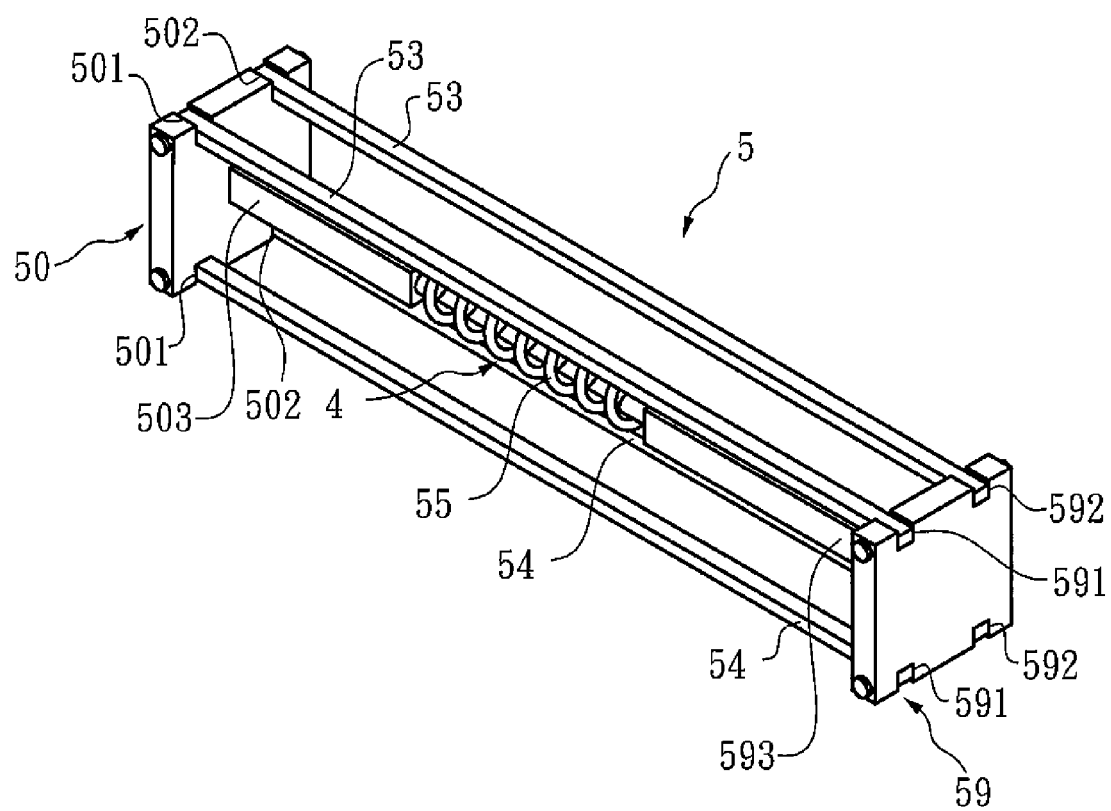
FIG. 13 is a schematic view of another embodiment of an articulation mechanism of the present invention.
Figure 14:
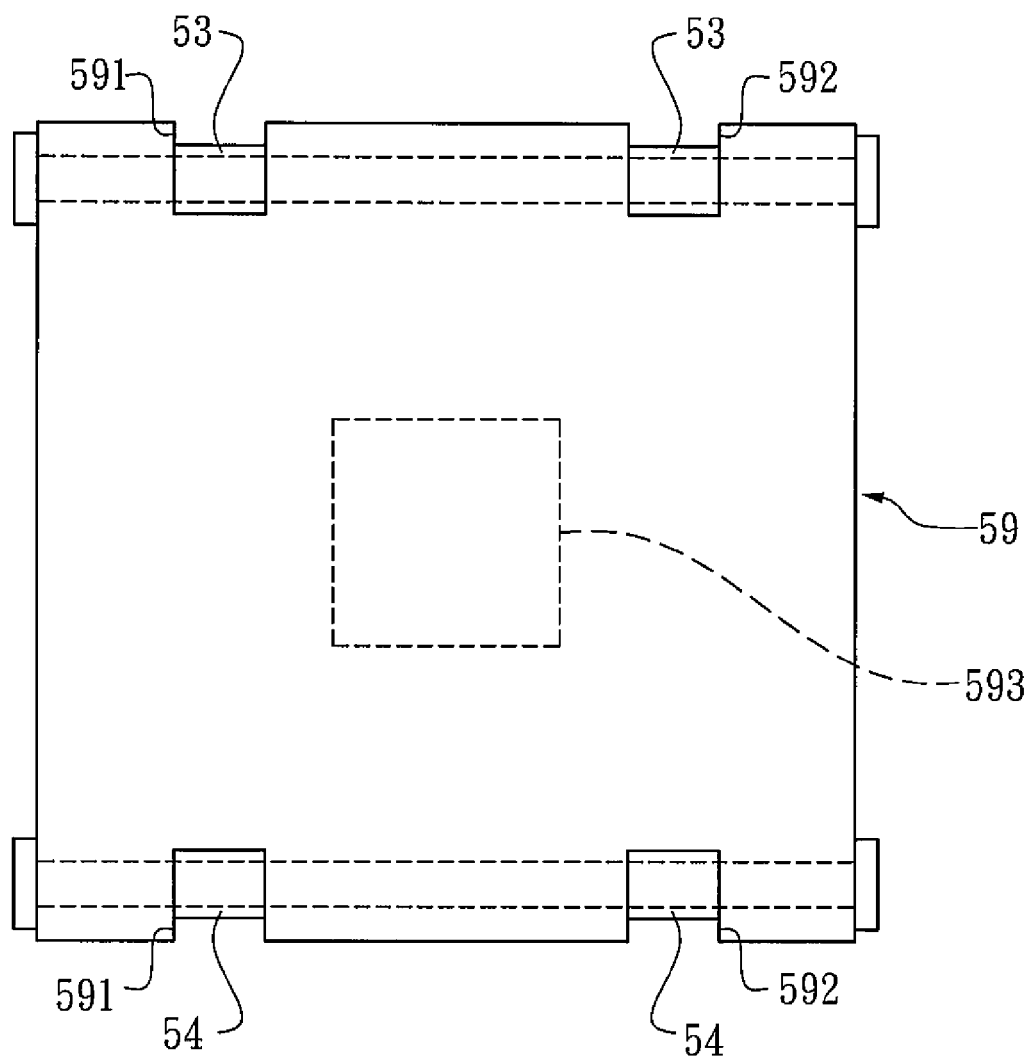
FIG. 14 is the right lateral view of FIG. 13.
Figure 15:
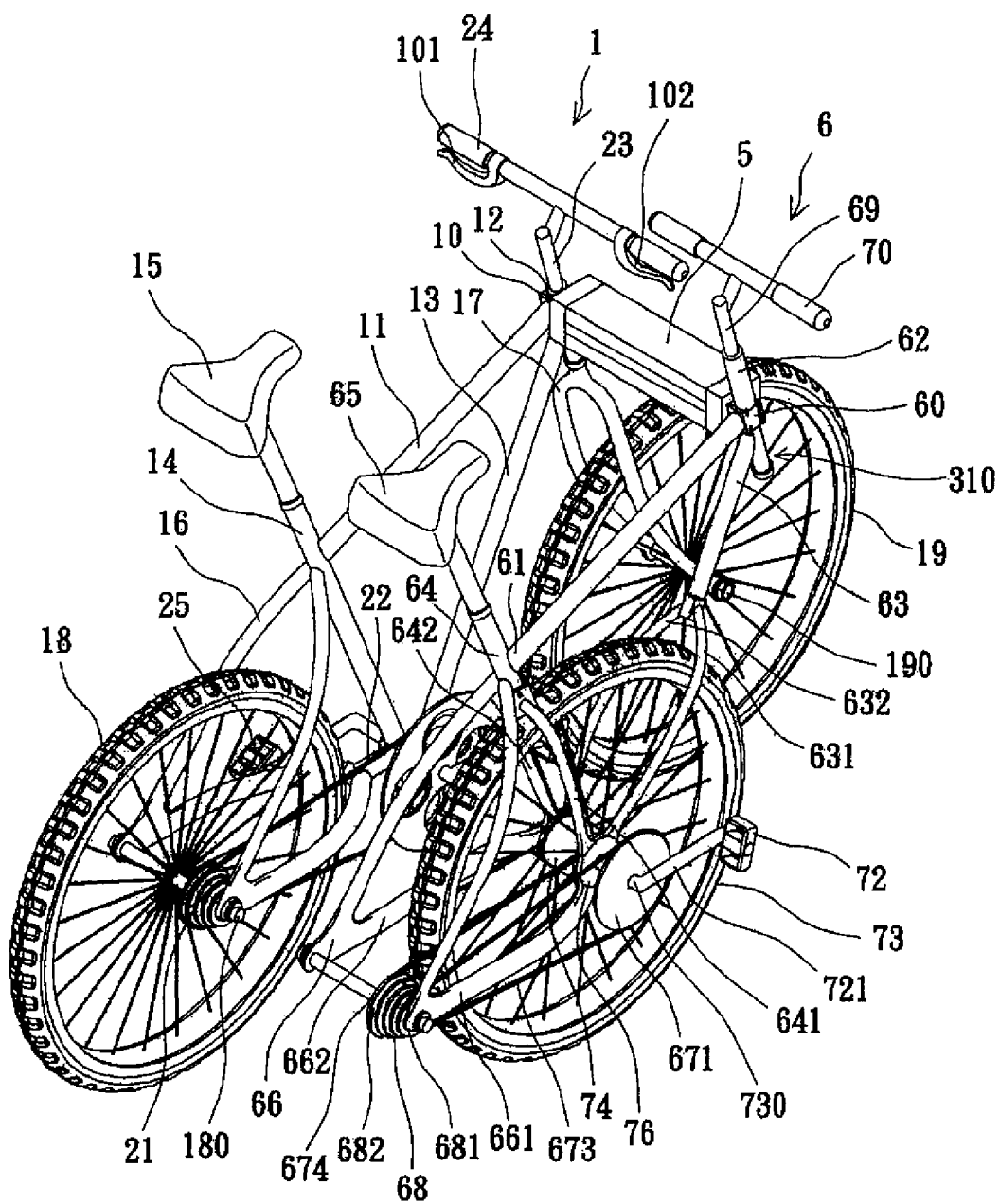
FIG. 15 is a perspective schematic view of another embodiment of a twin-frame bicycle of the present invention.

As shown in FIGS. 13 and 14, an articulation mechanism 5 according to another embodiment of the present invention is shown. The articulation mechanism 5 of this embodiment is substantially the same as that in FIGS. 7 and 8 of the present invention, and the same elements are designated with the same numerals and are therefore not described in detail. The difference between the above two embodiments lies in that, in this embodiment, the articulation mechanism 5 comprises four linking portions 53, 54, wherein two corresponding sides of the first end 50 has two slots 501, 502 and two corresponding sides of the second end 59 has two slots 591, 592. The linking portions 53, 54 are disposed pivotally in the corresponding slots 501 and 591 and in the corresponding slots 502 and 592 respectively.

Figure 4:
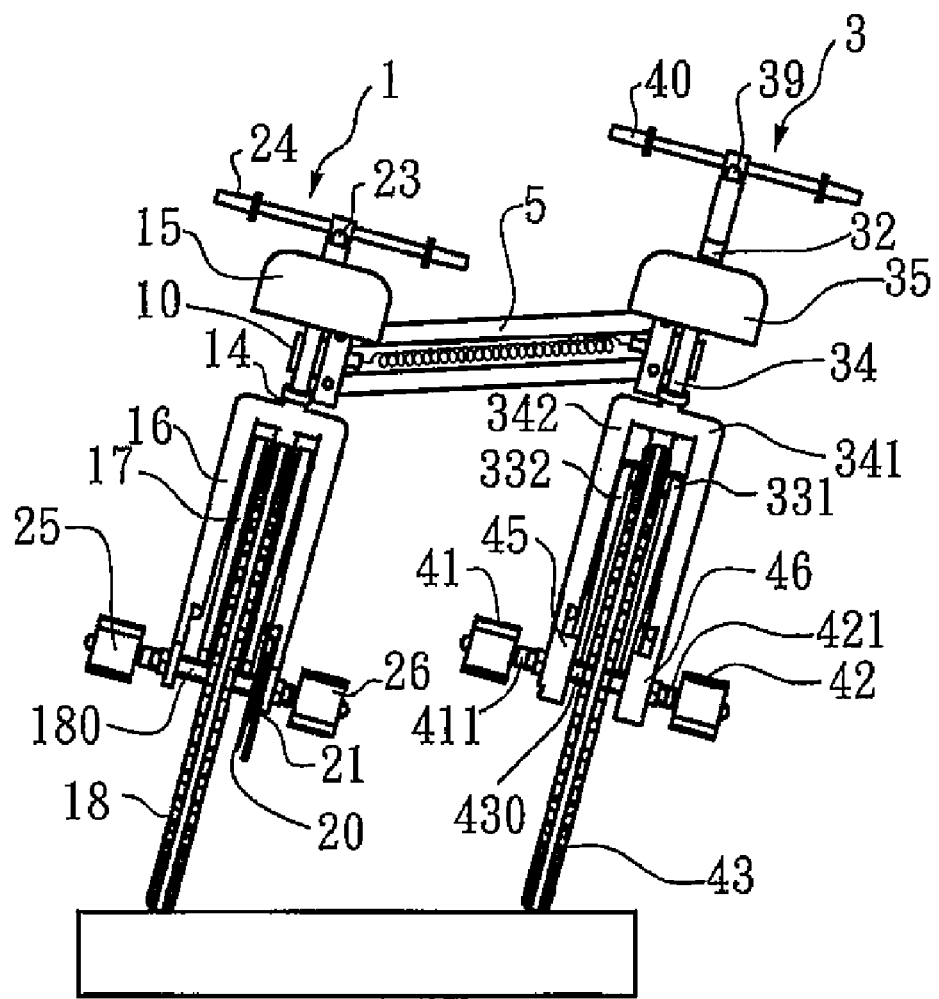
FIG. 4 is an operational view showing the twin-frame bicycle of the present invention during right turn.
Figure 5:
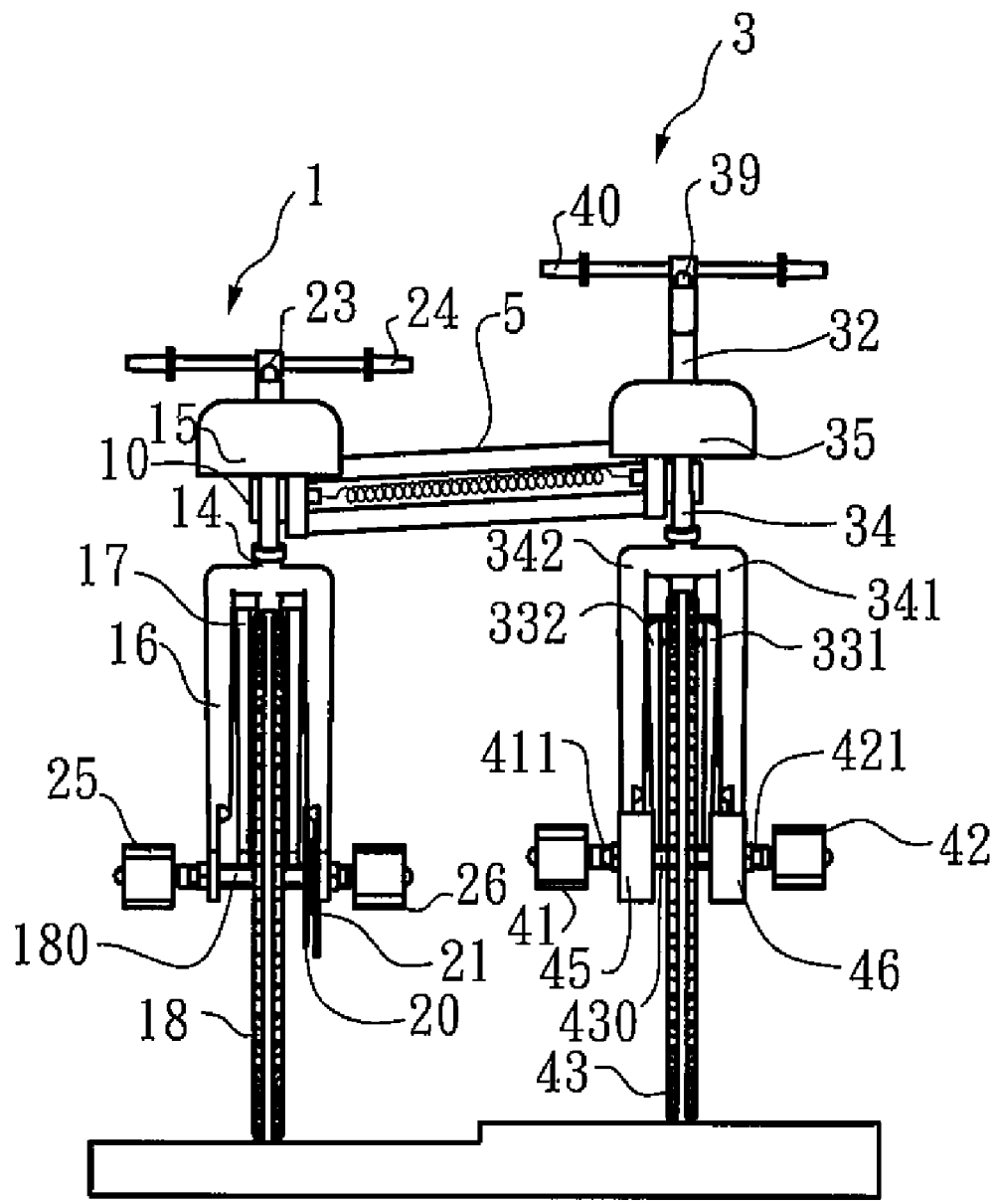
FIG. 5 is an operational view showing the twin-frame bicycle of the present invention passing over a bumpy road.

As shown in FIGS. 5, 7 and 8, when the twin-frame bicycle of the present invention moves over an uneven or bumpy road with some drops in height which make the road surface under the auxiliary bicycle body 3 higher than that under the primary bicycle body 1, the right end of the linking portions 53, 54 will slant downwards at a certain angle to offset the difference in height between the auxiliary bicycle body 3 and the primary bicycle body 1, and the tolerance between the linking portions 53, 54 and the holding bases 51, 52 will keep the auxiliary bicycle body 3 and the primary bicycle body 1 moving in parallel even under relative shift disposition or movement. In addition, the relative shift disposition or movement of the articulation mechanism 5 will make the elastic element 55 stretch and the elastic element 55 compress so that the resilient force of the stretched elastic element 55 will help keep the twin-frame bicycle in stable linkage. By the counterforce of the elastic element 55, both the auxiliary bicycle body 3 and the primary bicycle body 1 are kept stable and linked without inclining or tumbling. When the twin-frame bicycle of the present invention makes a right turn, the movements of the articulation mechanism 5 are as shown in FIGS. 4 and 8. When the twin-frame bicycle of the present invention makes a left turn, the movements of the articulation mechanism 5 are the inverse of those shown in FIGS. 4 and 8 and therefore not described in detail here. When the twin-frame bicycle of the present invention moves on an uneven and bumpy road with some drops in height and makes a left or right turn, the parallelogram synergy formed by the linking portions 53, 54 and the holding bases 51, 52 is just like an smoothly movable articulated joint, and the confined movement of the linking portions 53, 54 limited by the holding bases 51, 52 (holding cavities 511, 521) not only keeps both the auxiliary bicycle body 3 and the primary bicycle body 1 in automatically balanced coordination but also prevents the twin-frame bicycle of the present invention from overturning or tumbling.

The holding bases 51, 52 and the linking portions 53, 54 of the present invention can be made of rigid material (such as steel). Furthermore, to avoid strain due to exceeding stress, the contacting areas between both ends of the linking portions 53, 54 and the holding bases 51, 52 are preferably enlarged.

Figure 3:
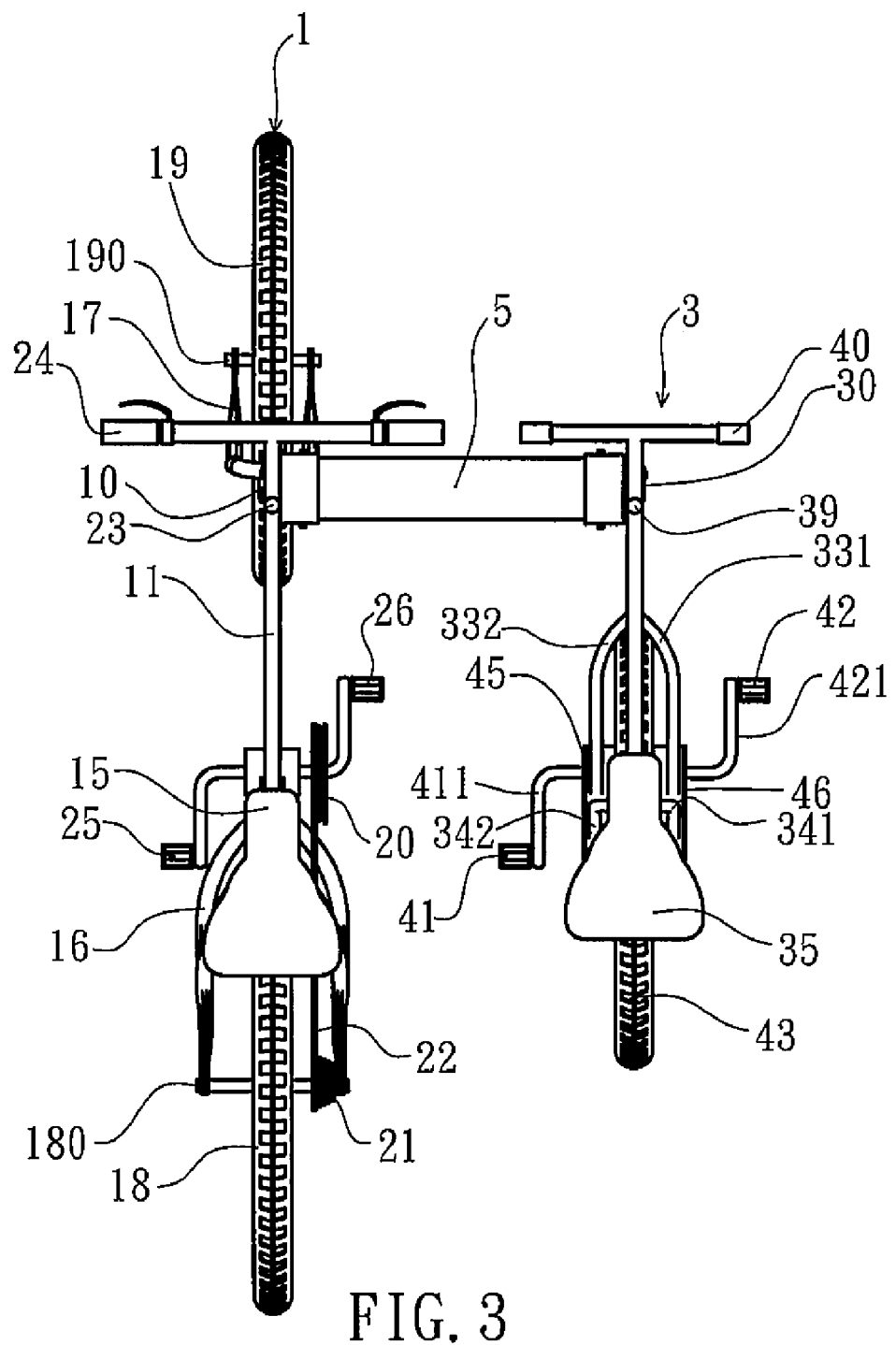
FIG. 3 is the top view of FIG. 1.

The auxiliary bicycle body 3 is arranged in parallel to the primary bicycle body 1 and, the shaft 430 of the first auxiliary wheel 43 is disposed between the shaft 190 of the front wheel 19 and shaft 180 of the rear wheel 18, i.e., the first auxiliary wheel 43 is disposed between the front wheel 19 and the rear wheel 18, as shown in FIGS. 2A and 3.

According to the present invention, the front wheel 19, the rear wheel 18 and the first auxiliary wheel 43 form a triangular base for the twin-frame bicycle and the riders' center of gravity is within the triangular base, which keeps the riders stable without any possibility of tumbling. Furthermore, the auxiliary bicycle body 3 can be chainless, and the twin-frame bicycle of the present invention can comprise two pedal mechanisms. Since the shaft of the active gear 371 may not interfere with the auxiliary wheel 43 (such as by utilizing the arrangement of middle gears 373 disposed between the active gear 371 and the passive gear 372), the bottom bracket can be flexibly designed with preferred value (BB value). Therefore, large or small auxiliary wheel can be suitable for the auxiliary bicycle body 3, and the riders' center of gravity is correspondingly above the fulcrum of the first auxiliary wheel 43, which keeps the riders comfortable and the twin-frame bicycle stable without any possibility of tumbling.

The steering handle 24 of the primary bicycle body 1 and the steering handle 40 of the auxiliary bicycle body 3 are adjustable, and this is a known technique and not described in detail here. Since the twin-frame bicycle of the present invention comprises the front wheel 19, the rear wheel 18 and the first auxiliary wheel 43, a brake line of the primary bicycle body 1 may be connected to the first auxiliary wheel 43 to brake the first auxiliary wheel 43, and this is a known technique and not described in detail or shown in the figures here. For safety purpose, a brake handle 101 can control the brake line connected to both the rear wheel 18 of the primary bicycle body 1 and the first auxiliary wheel 43 of the auxiliary bicycle body 3 to brake the twin-frame bicycle. Since the auxiliary bicycle body 3 does not comprise a front wheel and a rear wheel, a brake handle 102 of the primary bicycle body 1 is used only to brake the front wheel 19.

Another embodiment of an auxiliary bicycle body 6 is shown in FIGS. 15 to 18. Like the above-mentioned auxiliary bicycle body 3, the auxiliary bicycle body 6 may not comprise a front fork, a front wheel and a rear wheel but comprises a cross top bar 61, a head sleeve tube 62, a bottom bar 63, an upright seat bar 64, a saddle 65, a rear fork 66, a big sprocket wheel 671, a small sprocket wheel 672, an axle 69, a steering handle 70 and a pair of pedals 71, 72. The first auxiliary wheel 73 and an auxiliary sprocket wheel are connected pivotally to the auxiliary bicycle body 6. In this embodiment, the auxiliary bicycle body 6 further comprises two side bars 631, 632 and two upright bars 641, 642. The big sprocket wheel 671 and the first auxiliary wheel 73 are connected pivotally to the auxiliary bicycle body 6, and the big sprocket wheel 671 can be regarded as the auxiliary sprocket wheel.

Compared to the above-mentioned auxiliary bicycle body 3, the auxiliary bicycle body 6 further comprises the rear fork 66, and two side supporting bar 661, 662 are disposed at lower portion of the rear fork 66. The bottom bar 63 and the upright seat bar 64 are not very long and from two ends extend to connect two side bars 631, 632 and two upright side bars 641, 642, respectively. The side bars 631, 632, the upright side bars 641, 642 and the side supporting bar 661, 662 are connected two fixing base 75, 76, and the first auxiliary wheel 73 having a rung 74 is disposed pivotally between the fixing base 75, 76. In addition, a shaft 730 is disposed pivotally at the center of the first auxiliary wheel 73.

Two cranks 711, 721 connected with the pedals 71, 72 are connected to the corresponding ends of the shaft 730. Through the cranks 711, 721 the pedals 71, 72 drive the big sprocket wheel 671, and the small sprocket wheel 672 is disposed above the rung 74 and moves along with the rung 74. One end of the rear fork 66 is connected to the upright seat bar 64, and a speed-changing sprocket wheel assembly 68 is disposed at the other end of the rear fork 66. The speed-changing sprocket wheel assembly 68 is connected to the side supporting bar 661 which is on the same side as the big sprocket wheel 671, and the speed-changing sprocket wheel assembly 68 and the big sprocket wheel 671 are disposed at two ends of the side supporting bar 661. Two sprocket wheels 681, 682 of the speed-changing sprocket wheel assembly 68 engage with the big sprocket wheel 671 and the small sprocket wheel 672 through two chains 673, 674. The pedals 71, 72 of the auxiliary bicycle body 3 drive the big sprocket wheel 671, through one chain 673 the big sprocket wheel 671 drives the sprocket wheel 681, and through another chain 674 of the speed-changing sprocket wheel assembly 68 the sprocket wheel 682 drives the small sprocket wheel 672; as the big sprocket wheel 671, the rung 74 and the first auxiliary wheel 73 are connected pivotally to the auxiliary bicycle body 6 and move accordingly, the riders on the saddles 15, 65 only need to pedal the pedals 71, 72, and the twin-frame bicycle will move forward.

Figure 19:
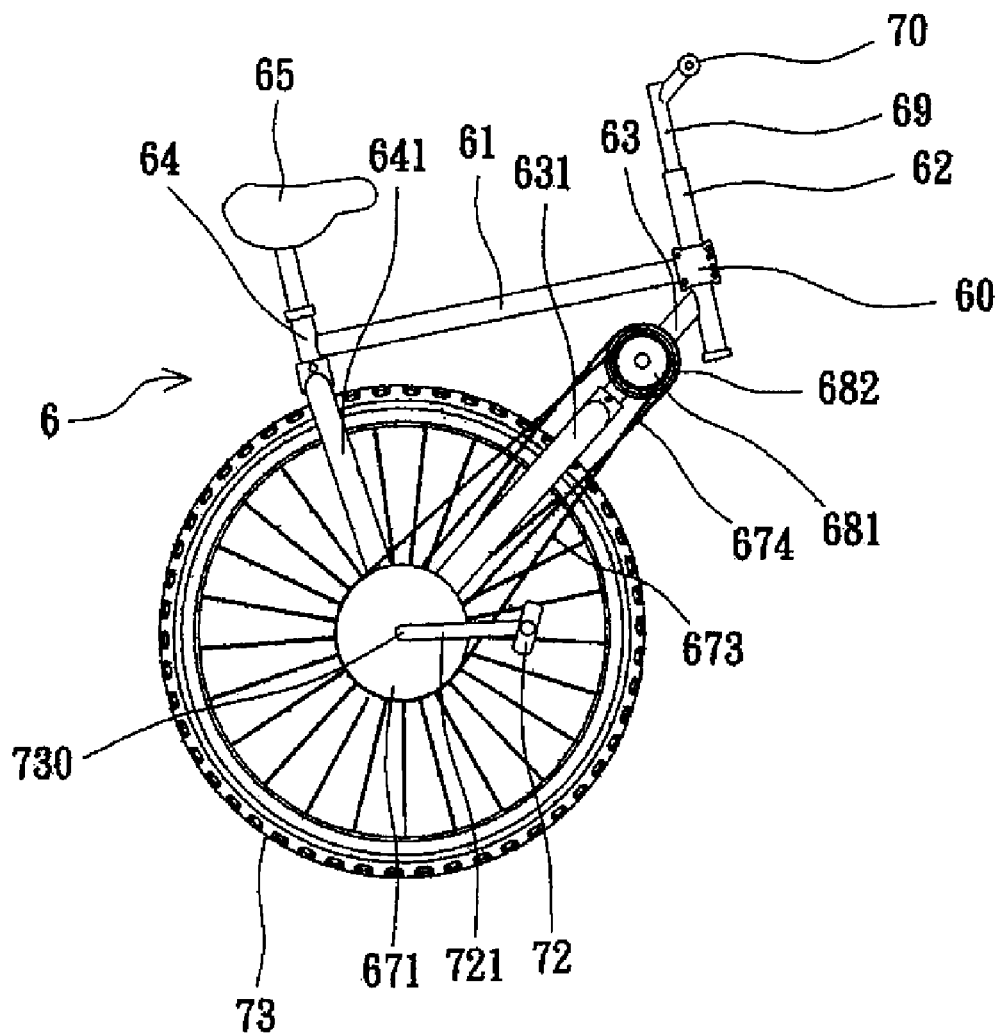
FIG. 19 is a schematic view of another embodiment of an auxiliary bicycle body of the present invention.

Another embodiment of an auxiliary bicycle body 6 is shown in FIG. 19. In this embodiment, the rear fork 66 is no longer needed and the speed-changing sprocket wheel assembly 68 is connected pivotally to the bottom bar 63. Similarly, the riders only need to pedal the pedals 71, 72 to drive the twin-frame bicycle to move forward; meanwhile, production materials and cost are saved.

Figure 20:
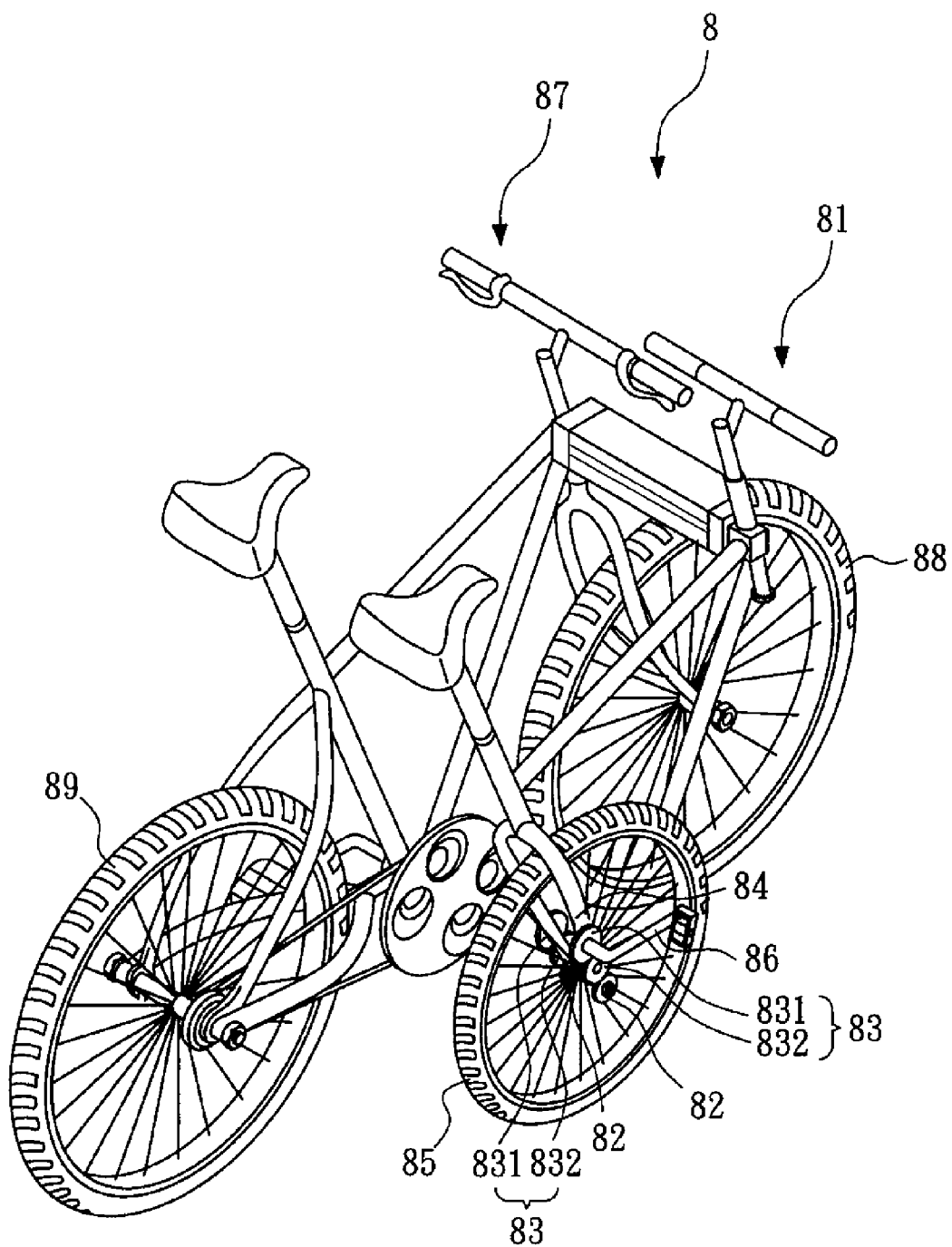
FIG. 20 is a schematic view of a further embodiment of a twin-frame bicycle of the present invention.
Figure 21:
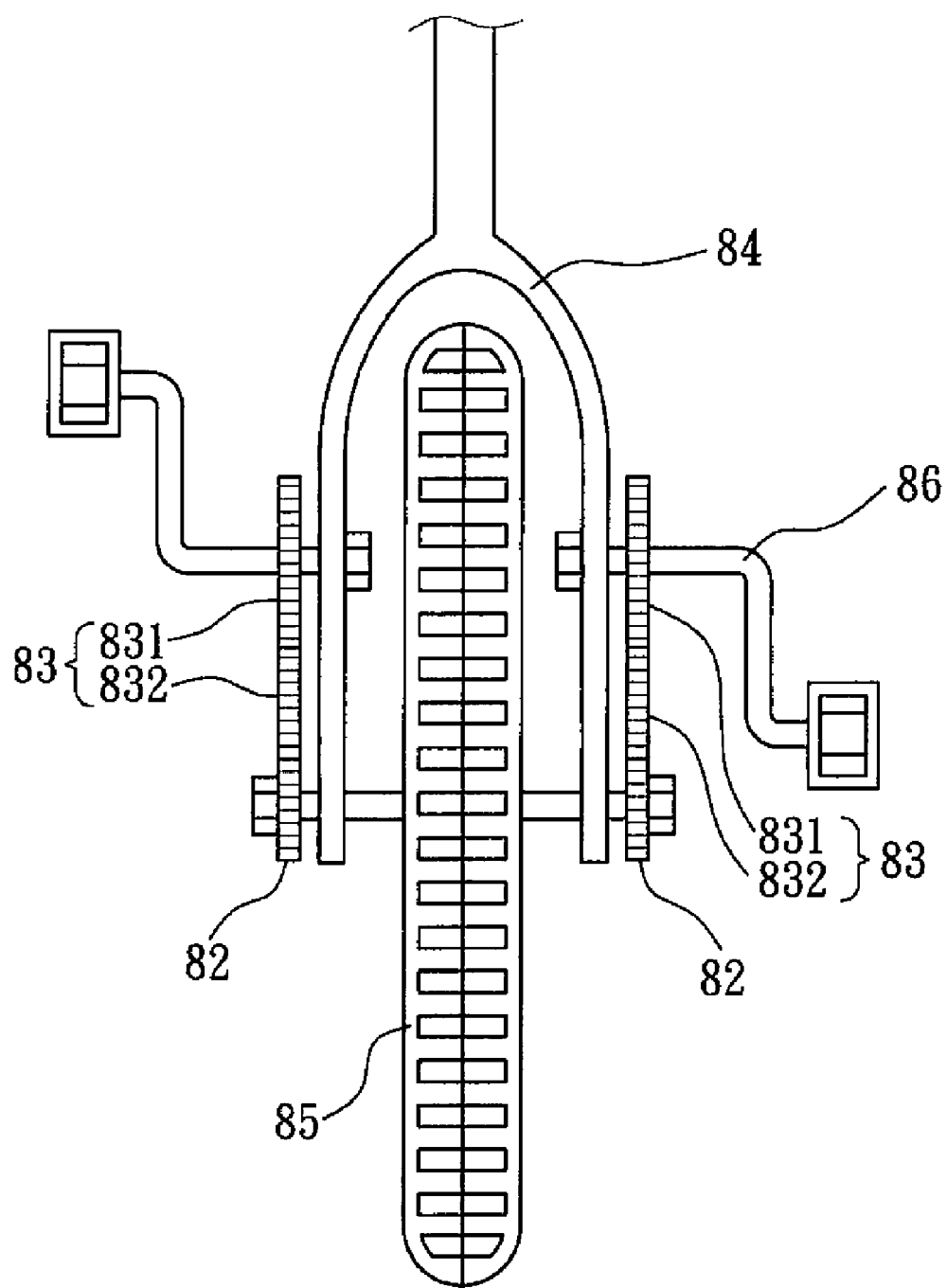
FIG. 21 is a schematic view of a gear assembly disposed at a rear fork of the auxiliary bicycle body according to FIG. 20 of the present invention.

FIG. 20 is a schematic view of a further embodiment of a twin-frame bicycle of the present invention. FIG. 21 is a schematic view of a gear assembly disposed at a rear fork of the auxiliary bicycle body according to FIG. 20 of the present invention. As shown in FIGS. 20 and 21, in this embodiment, an auxiliary bicycle body 81 of the twin-frame bicycle 8 comprises two auxiliary sprocket wheels 82, a gear assembly 83, an auxiliary rear fork 84, a first auxiliary wheel 85 and a pedal mechanism 86, wherein the diameter of the first auxiliary wheel 85 is smaller than that of a front wheel 88 and a rear wheel 89 of the primary bicycle body 87, and the gear assembly 83 comprises two active gears 831 and two passive gears 832. The auxiliary sprocket wheels 82 are connected pivotally to both sides of a shaft of the first auxiliary wheel 85. The active gears 831 are connected pivotally to the auxiliary rear fork 84 on both sides of the first auxiliary wheel 85. Each passive gear 832 is disposed between the corresponding active gear 831 and auxiliary sprocket wheel 82. The pedal mechanism 86 of the auxiliary bicycle body 81 drives the active gears 831 to drive the auxiliary sprocket wheels 82 through the passive gears 832, and the first auxiliary wheel 85 is driven to rotate. The gear assembly 83 is preferably disposed corresponding above the shaft of the first auxiliary wheel 85, and the ration of the diameters of the active gear 831 and the auxiliary sprocket wheels 82 is 3:1. In addition, in other applications, the gear assembly 83 can be covered in a housing, and the housing can provide protection for the gear assembly 83.

Figure 22:
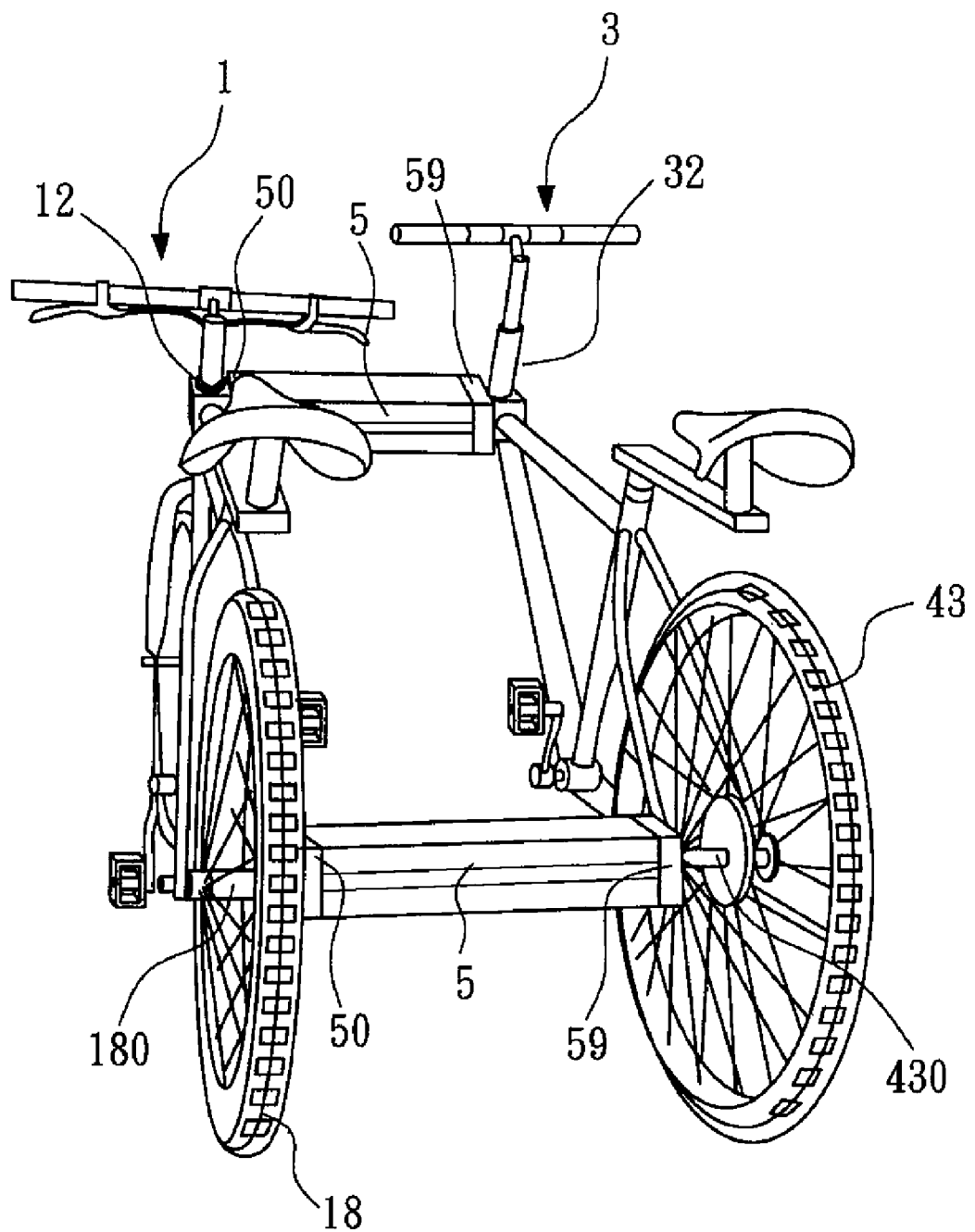
FIG. 22 is a perspective schematic view of a twin-frame bicycle which has two articulation mechanisms of the present invention.
Figure 23:
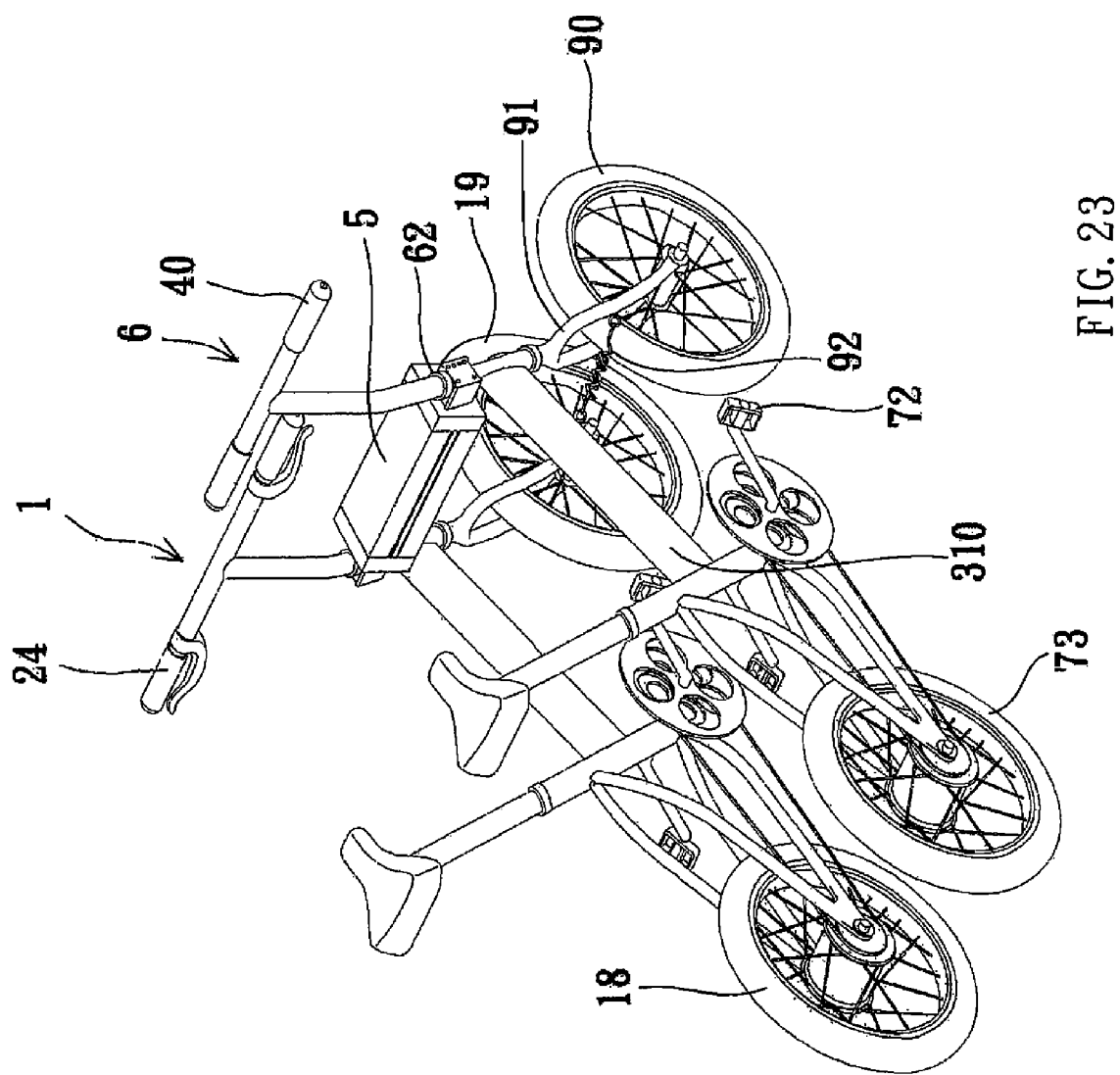
FIGS. 23-26 are schematic views of another embodiment of a twin-frame bicycle of the present invention.
Figure 24:
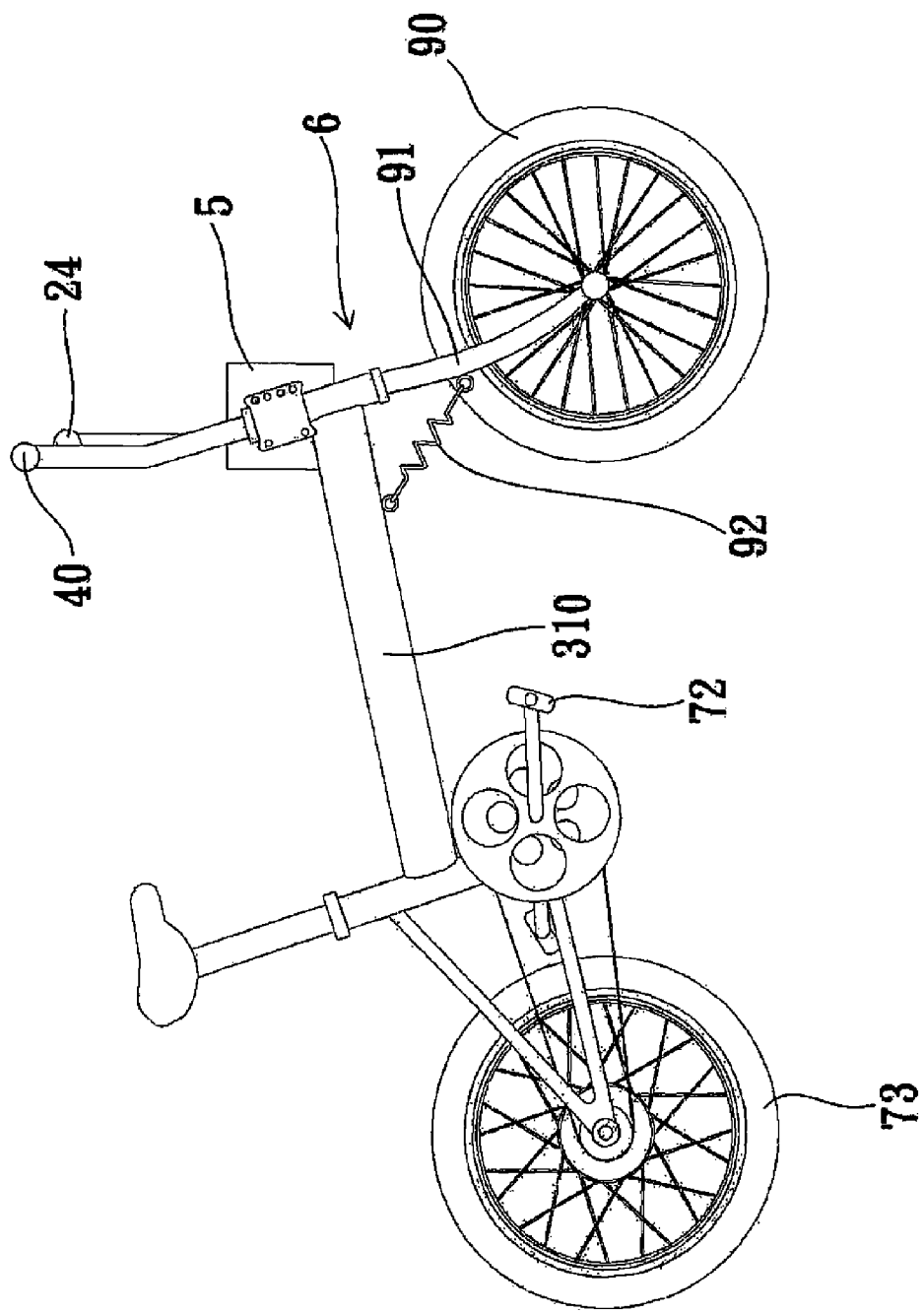
Figure 25:
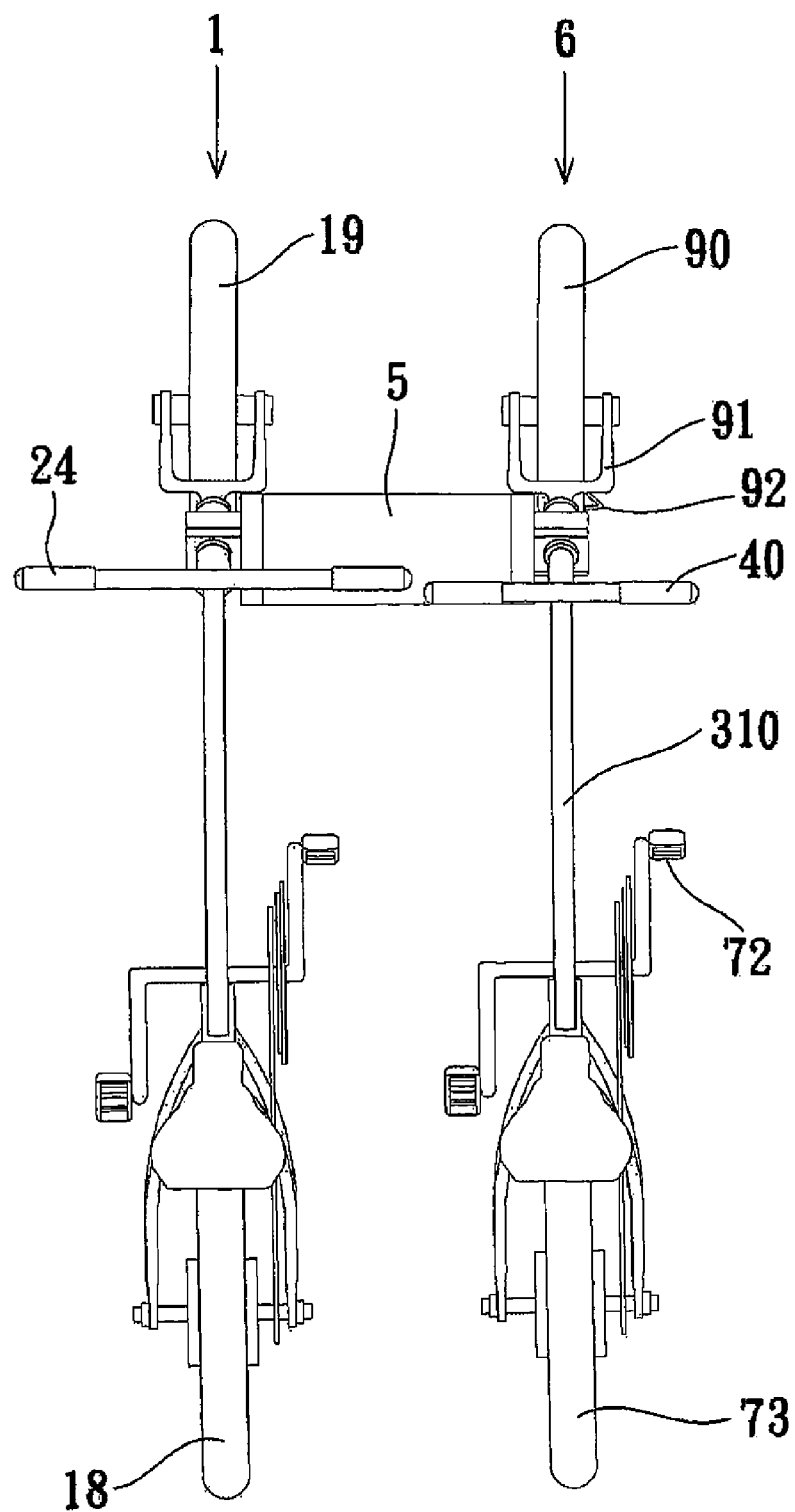
Figure 26:
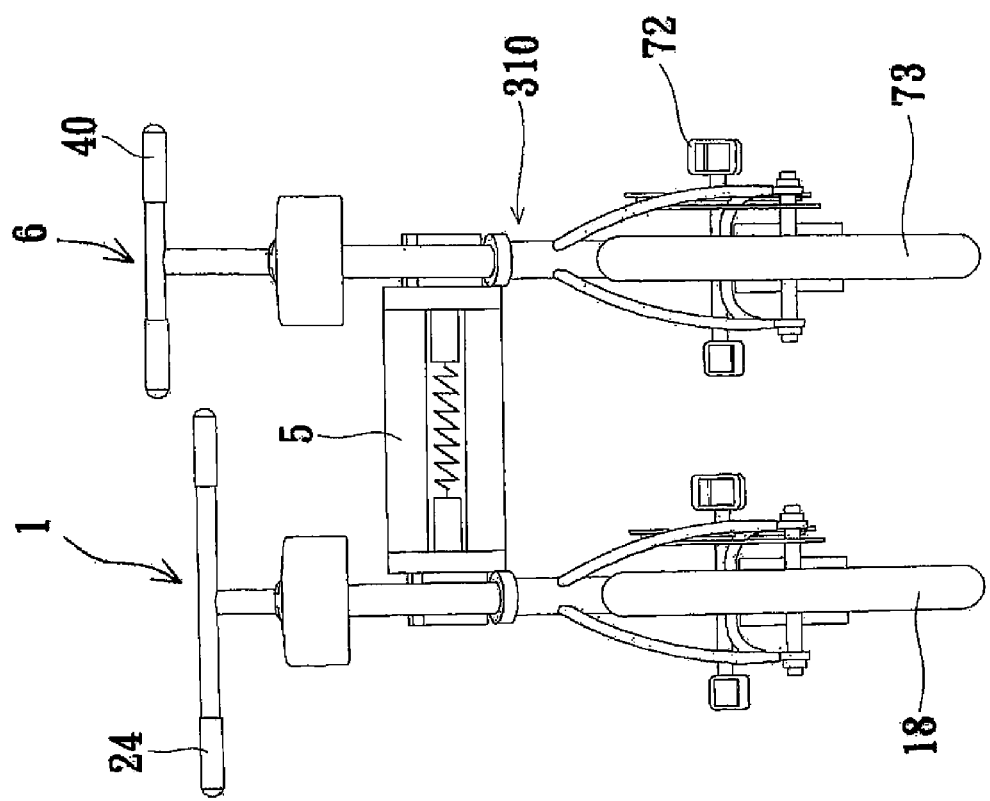

Referring to FIGS. 6 and 22, it is to be noted that each of twin-frame bicycles according to the above-mentioned embodiments can comprise two articulation mechanisms 5, wherein the first end 50 and the second end 59 of one of the articulation mechanisms 5 are connected to the head sleeve tube 12 of the primary bicycle body 1 (the primary bicycle frame) and the head sleeve tube 32 of the auxiliary bicycle body 3 (the auxiliary bicycle frame), and the first end 50 and the second end 59 of the other articulation mechanism 5 are connected respectively to the shaft 180 of the rear wheel 18 and the shaft 430 of the first auxiliary wheel 43, and thus the shaft 430 of the first auxiliary wheel 43 is disposed substantially along an extension line of the shaft 180 of the rear wheel 18.

Figure 16:
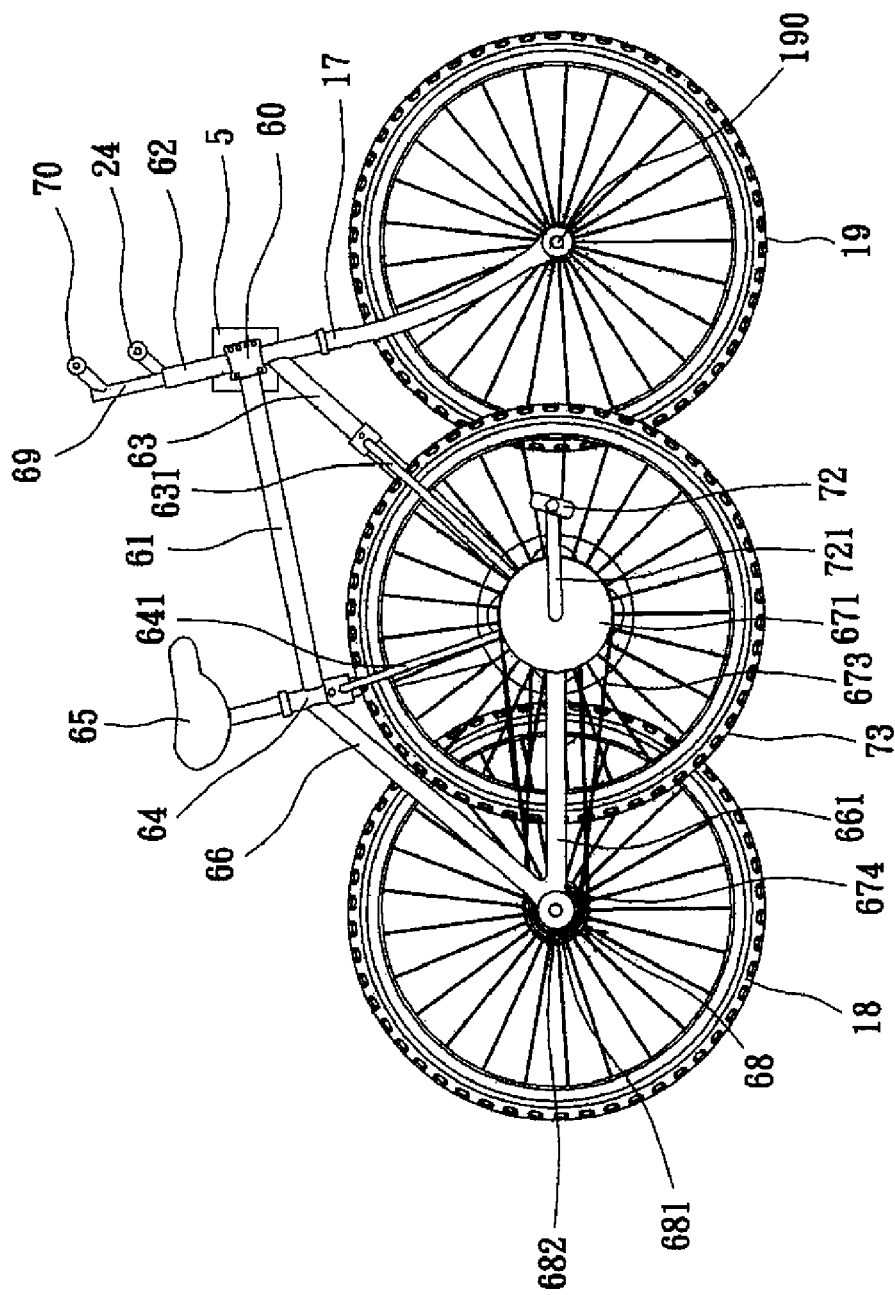
FIG. 16 is the right lateral view of FIG. 15.
Figure 17:
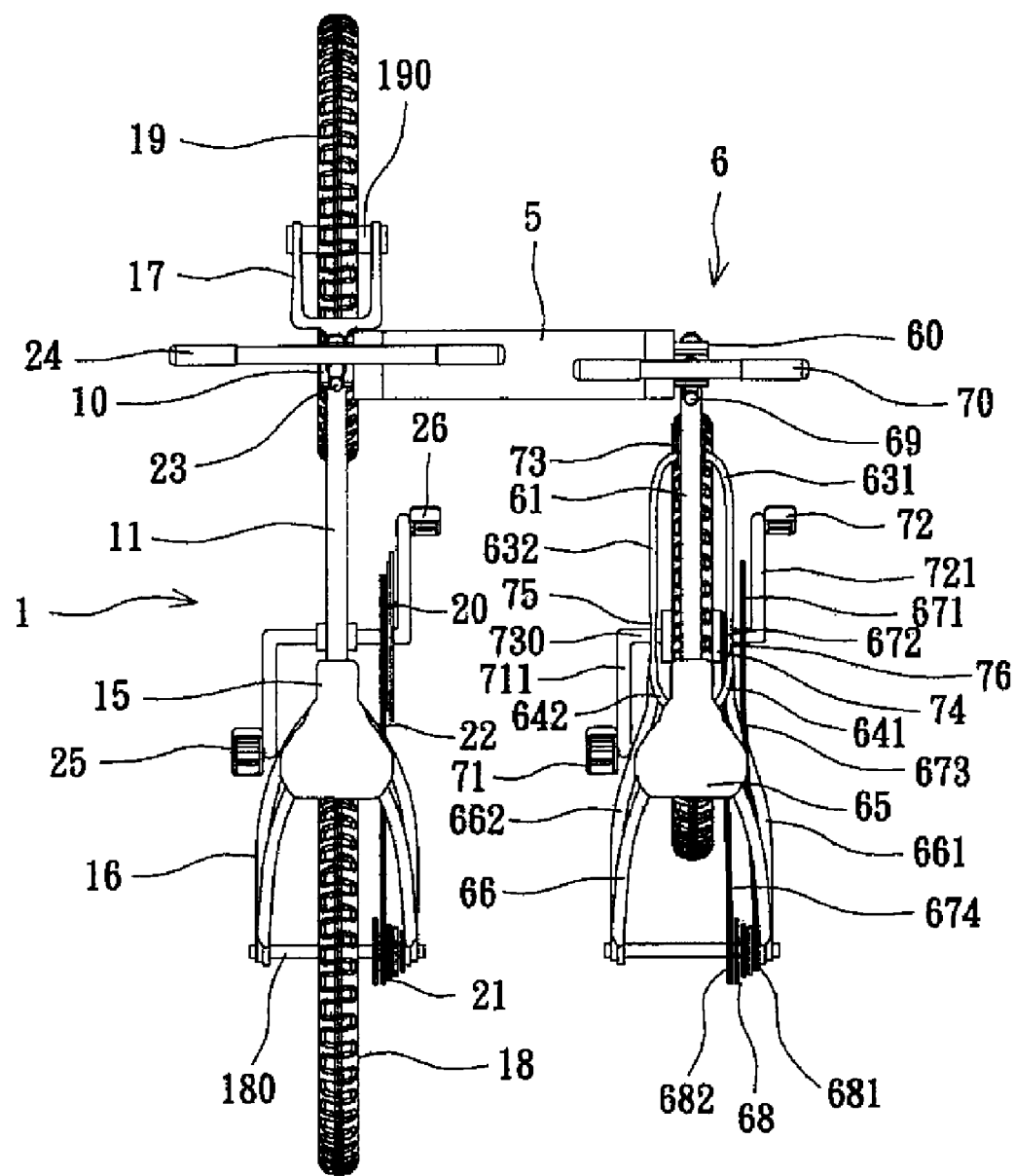
FIG. 17 is the top lateral view of FIG. 15.
Figure 18:
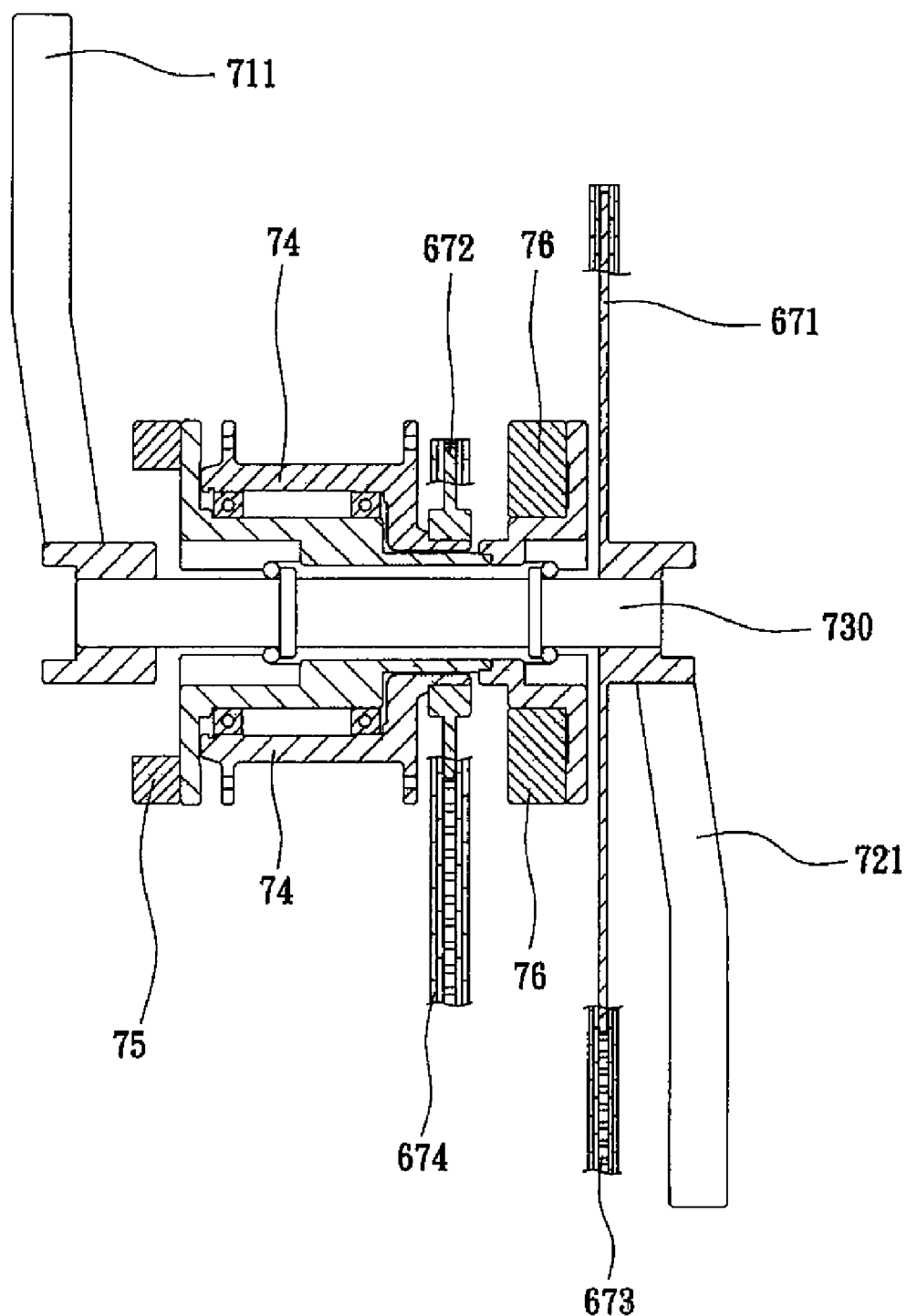
FIG. 18 is a cross-sectional view showing a wheel structure of an auxiliary bicycle body according to FIG. 15 of the present invention.

FIGS. 23-26 are schematic views of another embodiment of a twin-frame bicycle of the present invention. The twin-frame bicycle of the embodiment as shown in FIGS. 23-26 is substantially the same as the twin-frame bicycle of the embodiment as shown in FIG. 16, and the same elements are designated with the same numerals. The difference between the above two embodiment lies in that, in the embodiment as shown in FIGS. 23-26, the auxiliary bicycle body 6 can further comprise a second auxiliary wheel 90, a front fork 91 and two resilient elements 92. The first auxiliary wheel 73 and the second auxiliary wheel 90 are connected pivotally to the auxiliary bicycle frame 310 and distanced from each other, and the pedal mechanism 72 of the auxiliary bicycle body 6 is used to drive the first auxiliary wheel 73 (or the pedal mechanism 72 of the auxiliary bicycle body 6 can be used to drive the second auxiliary wheel 90 in other embodiments). The front fork 91 is connected pivotally to the head sleeve tube 62, the second auxiliary wheel 90 is connected pivotally between two branches of the front fork 91, and the resilient elements 92 are connected to the respective branches of the front fork 91. However, it should be noted that in other embodiments, the twin-frame bicycle as shown in FIGS. 23-26 can comprise two articulation mechanisms 5 (referring to FIG. 22).

Preferably, the steering handle 40 of the auxiliary bicycle body 6 is fixed at the head sleeve tube 62 and non-rotatable; and the front fork 91 is connected pivotally to the head sleeve tube 62 and rotatable. The steering handle 24 of the primary bicycle body 1 is in charge of turning the twin-frame bicycle.

In this embodiment, the steering handle 40 of the auxiliary bicycle body 6 is used for handling but not controlling the twin-frame bicycle. When the steering handle 24 of the primary bicycle body 1 is controlled to make the twin-frame bicycle turn, the steering handle 40 of the auxiliary bicycle body 6 does not move or rotate, and according to the theory of physics, the second auxiliary wheel 90 will rotate and turn due to the turn of the front wheel 19. The resilient elements 92 can provide a resilient force and keeps the second auxiliary wheel 90 turning naturally by the same angle with the front wheel 19, synchronously. Furthermore, the twin-frame bicycle of the invention is highly stable without any possibility of tumbling, even in a high-speed riding and/or a sudden braking.

However, it should be noted that the auxiliary bicycle body 6 as shown in FIGS. 24-27 can be separated from the twin-frame bicycle, to be an individual bicycle (the auxiliary bicycle body 6) for one rider's riding. For the separated individual bicycle (the auxiliary bicycle body 6), the steering handle 40 and the front fork 91 of the auxiliary bicycle body 6 may be directly or indirectly connected (for example, through an adjustable connection switching device) so as to move or rotate synchronously.

In sum, a primary bicycle body (such as a conventional bicycle body) can be linked with an auxiliary bicycle body to form a twin-frame bicycle of the present invention, for two riders to ride side by side in parallel and pedal individually.

Additionally, the articulation mechanism of the present invention is designed with functions in the three-dimensioned structure. The articulation mechanism has rigidity in horizontal and is free in vertical. That is, the articulation mechanism can not only keep the primary bicycle body and the auxiliary bicycle body in parallel but also allow the primary bicycle body and the auxiliary bicycle body moving stably in different levels (such as driving over an uneven or bumpy road with some drops in height). The wheels of the primary bicycle body and the auxiliary bicycle body can move vertically and in parallel to stabilize and balance the twin-frame bicycle, thus solving the problem of tumbling or overturning when driving over an uneven or bumpy road and/or making a turn.

Besides providing fun riding, the articulation mechanism linking the primary bicycle body and the auxiliary bicycle body makes the twin-frame bicycle stable and unlikely to tumble or overturn. Moreover, by utilizing the articulation mechanism together with a resilient tension mechanism having an elastic element, the twin-frame bicycle can always stand straight up and be controlled much smoothly. Furthermore, since the structure of the auxiliary bicycle body is simple, the cost is saved and the maintenance of the twin-frame bicycle is easy.

In addition, since the auxiliary wheel can be disposed between the front wheel and the rear wheel of the primary bicycle body, the center of gravity of the twin-frame bicycle will not be located at the rear, so the saddles need not be disposed much toward the back. Moreover, the primary bicycle body and the auxiliary bicycle body need only one articulation mechanism to link them, and the structure of the twin-frame bicycle of the present invention can be further simplified, thus further saving production cost.

While the embodiments of the present invention have been illustrated and described, various modifications and improvements can be made by those skilled in the art. The embodiments of the present invention are therefore described in an illustrative but not restrictive sense. It is intended that the present invention is not limited to the particular forms as illustrated, and that all modifications that maintain the spirit and scope of the present invention are within the scope defined in the appended claims.

What is claimed is:

1. A twin-frame bicycle, comprising:
   a primary bicycle body, having a primary bicycle frame, a front wheel, a rear wheel and a pedal mechanism, wherein the front wheel and the rear wheel are connected rotatably to the primary bicycle frame and distanced from each other, and the pedal mechanism is used to drive the front wheel or the rear wheel;
   an auxiliary bicycle body, having an auxiliary bicycle frame and a first auxiliary wheel, wherein the first auxiliary wheel is connected rotatably to the auxiliary bicycle frame;
   at least one articulation mechanism, having a first end, a second end and at least two linking portions, wherein the first end and the second end are connected to the primary bicycle frame and the auxiliary bicycle frame, respectively, the linking portions are substantially disposed in parallel between the first end and the second end, and the first end, the second end and the linking portions forming a movable quadrangle; and
   a resilient tension mechanism, having an elastic element disposed between the primary bicycle body and the auxiliary bicycle body.

2. The twin-frame bicycle according to claim 1, wherein the primary bicycle body further comprises a front sprocket wheel, a rear sprocket wheel and a chain, the front sprocket wheel is connected rotatably to the primary bicycle frame, the rear sprocket wheel and the rear wheel are distanced from the front sprocket wheel and connected rotatably to the primary bicycle frame, the chain links the front sprocket wheel and rear sprocket wheel in engagement manner, and the pedal mechanism drives the front sprocket wheel rotating to drive the rear sprocket wheel through the chain and rotate the rear wheel.

3. The twin-frame bicycle according to claim 2, wherein the primary bicycle frame further comprises a steering handle, a head sleeve tube, a front fork, a rear folk, an upright seat bar and a saddle, the steering handle and the front fork are connected rotatably to the two corresponding sides of the head sleeve tube, the front wheel is connected rotatably to the front fork, the rear wheel is connected rotatably to the rear fork, and the saddle is disposed on the top of the upright seat bar.

4. The twin-frame bicycle according to claim 1, wherein the auxiliary bicycle body further comprises a steering handle, a head sleeve tube, an upright seat bar, a saddle and a pedal mechanism, the steering handle is connected rotatably to the head sleeve tube, the saddle is disposed on a top of the upright seat bar, and the pedal mechanism of the auxiliary bicycle body drives the first auxiliary wheel.

5. The twin-frame bicycle according to claim 4, wherein a shaft of the first auxiliary wheel is disposed between those of the front wheel and the rear wheel.

6. The twin-frame bicycle according to claim 4, wherein the auxiliary bicycle body further comprises an auxiliary sprocket wheel, the auxiliary sprocket wheel is connected rotatably to the shaft of the first auxiliary wheel, and the pedal mechanism of the auxiliary bicycle body drives the auxiliary sprocket wheel to rotate the first auxiliary wheel.

7. The twin-frame bicycle according to claim 6, wherein the auxiliary bicycle body further comprises two fixing bases, an active gear, a passive gear and an idler box, the first auxiliary wheel further comprises a rung, the fixing bases are connected to both sides of the shaft of the first auxiliary wheel, the active gear is a fixed gear, the passive gear is a movable gear, the active gear and the passive gear are disposed between the fixing bases, the idler box is connected to one of the fixing bases and covers the active gear and the passive gear, the shaft of the first auxiliary wheel pivots the active gear and the passive gear in the idler box and make the active gear and the passive gear engaging with an idler assembly, a small idler of the idler assembly engages with the active gear, a big idler of the idler assembly engages with the passive gear, the big idler drives the passive gear, and the passive gear drives the rung to rotate the first auxiliary wheel.

8. The twin-frame bicycle according to claim 6, wherein the auxiliary bicycle body further comprises a speed-changing sprocket wheel assembly and two chains, the auxiliary bicycle frame further comprises two side bars, two upright bars and an auxiliary rear fork, the first auxiliary wheel further comprises a rung, the rung is connected to both sides of the shaft of the first auxiliary wheel, the side bars and the upright bars are connected rotatably to the shaft of the first auxiliary wheel, one end of the auxiliary rear fork is connected to each upright bar, the speed-changing sprocket wheel assembly is disposed at the other end of the auxiliary rear fork, the pedal mechanism of the auxiliary bicycle body drives the auxiliary sprocket wheel to further drive the speed-changing sprocket wheel assembly through one of the chains, and first the auxiliary wheel is driven to rotate through the other chain.

9. The twin-frame bicycle according to claim 4, wherein the auxiliary bicycle body further comprises two auxiliary sprocket wheels, a gear assembly and an auxiliary rear fork, the gear assembly comprises two active gears and two passive gears, the auxiliary sprocket wheels are connected rotatably to both sides of the shaft of the first auxiliary wheel, the active gears are connected rotatably to the auxiliary rear fork on both sides of the first auxiliary wheel, each passive gear is disposed between the corresponding active gear and auxiliary sprocket wheel, the pedal mechanism of the auxiliary bicycle body drives the active gears to drive the auxiliary sprocket wheels through the passive gears, and the first auxiliary wheel is driven to rotate.

10. The twin-frame bicycle according to claim 4, wherein the auxiliary bicycle body further comprises a second auxiliary wheel, the first auxiliary wheel and the second auxiliary wheel are connected rotatably to the auxiliary bicycle frame and distanced from each other, and the pedal mechanism is used to drive the first auxiliary wheel or the second auxiliary wheel.

11. The twin-frame bicycle according to claim 10, wherein the auxiliary bicycle body further comprises a front fork and two resilient elements, the front fork is connected rotatably to the head sleeve tube, the second auxiliary wheel is connected rotatably between two branches of the front fork, and the resilient elements are connected to the respective branches of the front fork.

12. The twin-frame bicycle according to claim 1, wherein the primary bicycle body and the auxiliary bicycle body are linked and juxtaposed in parallel.

13. The twin-frame bicycle according to claim 1, wherein the center of gravity of the twin-frame bicycle is within the triangular region defined by the front wheel, the rear wheel and the first auxiliary wheel.

14. The twin-frame bicycle according to claim 1, wherein each of the first end and the second end has at least one holding base, each holding base has a holding cavity, each cavity has an upper portion and a lower portion, and the linking portions are disposed rotatably in the upper portion and the lower portion of the holding cavities respectively and are substantially in parallel.

15. The twin-frame bicycle according to claim 1, wherein two ends of the elastic element are connected to the first end and the second end, respectively, and the elastic element is substantially parallel to the linking portions.

16. The twin-frame bicycle according to claim 15, wherein the first end further comprises a first foundation, the second end further comprises a second foundation, and the two ends of the elastic element are connected to the first foundation and the second foundation, respectively.

17. The twin-frame bicycle according to claim 16, wherein the first foundation and the second foundation are protrusions, and the two ends of the elastic element are connected to corresponding ends of the protrusions, respectively.

18. The twin-frame bicycle according to claim 16, wherein the resilient tension mechanism further comprises a first adjustable unit and a second adjustable unit, disposed at two ends of the elastic element, the first adjustable unit comprises a first stepping portion and a first adjusting portion, the second adjustable unit comprises a second stepping portion and a second adjusting portion, the first foundation further comprises a first recess, the second foundation further comprises a second recess, the first and second stepping portions penetrate the first and second foundations, respectively, the first and second adjusting portions are disposed in the first and second recesses and connected to the first and second stepping portions, respectively.

19. The twin-frame bicycle according to claim 1, wherein two ends of the resilient tension mechanism are connected to the primary bicycle body and the auxiliary bicycle body, respectively, and the elastic element is substantially parallel to the linking portions.

20. The twin-frame bicycle according to claim 1, wherein two ends of the resilient tension mechanism are connected to the at least two linking portions, respectively, and the elastic element is substantially orthogonal to the linking portions.

21. The twin-frame bicycle according to claim 20, wherein the resilient tension mechanism further comprises a first adjustable unit and a second adjustable unit, disposed at two ends of the elastic element, the first adjustable unit comprises a first stepping portion and a first adjusting portion, the second adjustable unit comprises a second stepping portion and a second adjusting portion, the first and second stepping portions penetrate the linking portions, respectively, the first and second adjusting portions are connected to the first and second stepping portions, respectively, and the linking portions are between the first and second adjusting portions.

22. The twin-frame bicycle according to claim 1, wherein the elastic element is a spring.

23. The twin-frame bicycle according to claim 1, wherein the articulation mechanism comprises four linking portions, two corresponding sides of the first end and two corresponding sides of the second end have two slots, and each linking portion is disposed rotatably in the corresponding slots of the first end and the second end.

24. The twin-frame bicycle according to claim 1, wherein the auxiliary bicycle body further comprises an additional wheel and an adjustable bar, one end of the adjustable bar is connected to the auxiliary bicycle frame, and the additional wheel is disposed at the other end of the adjustable bar.

* * * * *